United States Patent
Goto et al.

(10) Patent No.: US 10,770,108 B2
(45) Date of Patent: Sep. 8, 2020

(54) DISC STORAGE APPARATUS AND DISC ARCHIVE APPARATUS

(71) Applicant: SONY SEMICONDUCTOR SOLUTIONS CORPORATION, Kanagawa (JP)

(72) Inventors: Naofumi Goto, Kanagawa (JP); Takeshi Kubo, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 16/344,571

(22) PCT Filed: Oct. 6, 2017

(86) PCT No.: PCT/JP2017/036427
§ 371 (c)(1),
(2) Date: Apr. 24, 2019

(87) PCT Pub. No.: WO2018/100882
PCT Pub. Date: Jun. 7, 2018

(65) Prior Publication Data
US 2019/0287565 A1 Sep. 19, 2019

(30) Foreign Application Priority Data

Dec. 2, 2016 (JP) ................................. 2016-234711

(51) Int. Cl.
*G11B 17/22* (2006.01)
*G11B 17/04* (2006.01)
(Continued)

(52) U.S. Cl.
CPC ........ *G11B 17/225* (2013.01); *G11B 17/0407* (2013.01); *G11B 17/053* (2013.01);
(Continued)

(58) Field of Classification Search
CPC ..... G11B 23/03; G11B 17/053; G11B 23/023; G11B 17/22; G11B 17/0407; G11B 23/0323; G11B 17/225
See application file for complete search history.

(56) References Cited

U.S. PATENT DOCUMENTS

| | | | | |
|---|---|---|---|---|
| 2,868,360 A | * | 1/1959 | Donkin | B65D 25/04 206/3 |
| 4,335,816 A | * | 6/1982 | Rager | E05B 5/00 206/1.5 |

(Continued)

FOREIGN PATENT DOCUMENTS

| | | |
|---|---|---|
| AU | 2002257762 A1 | 10/2003 |
| CA | 2460684 A1 | 10/2003 |

(Continued)

OTHER PUBLICATIONS

International Search Report and Written Opinion of PCT Application No. PCT/JP2017/036427, dated Nov. 28, 2017, 11 pages of ISRWO.

*Primary Examiner* — Brian E Miller
(74) *Attorney, Agent, or Firm* — Chip Law Group

(57) ABSTRACT

Provided is a disc storage apparatus that includes a case including an opening on an upper surface of the case and capable of storing N rows of stacked M disc-shaped recording media (N and M each indicate a positive integer of two or greater), a tray cover that slides from a rear end of the case and cover the opening, and a locking mechanism that locks a state of the opening being covered.

11 Claims, 23 Drawing Sheets

(51) Int. Cl.
*G11B 17/053* (2006.01)
*G11B 23/03* (2006.01)
*G11B 23/023* (2006.01)

(52) U.S. Cl.
CPC ............ *G11B 17/22* (2013.01); *G11B 23/023* (2013.01); *G11B 23/03* (2013.01)

(56) References Cited

U.S. PATENT DOCUMENTS

| | | | | |
|---|---|---|---|---|
| 4,655,344 | A * | 4/1987 | Ackeret | G11B 33/0416 206/308.1 |
| 5,235,474 | A * | 8/1993 | Searle | G11B 15/6815 360/71 |
| 5,415,283 | A * | 5/1995 | Kim | G11B 33/0405 206/308.3 |
| 5,684,654 | A * | 11/1997 | Searle | G11B 15/6815 360/92.1 |
| 5,707,124 | A * | 1/1998 | Johnson | A47B 81/068 206/308.1 |
| 5,709,300 | A * | 1/1998 | Bolognia | G11B 33/0427 206/308.1 |
| 5,816,393 | A * | 10/1998 | Kim | G11B 33/0483 206/307.1 |
| 5,940,243 | A * | 8/1999 | Kanetsuku | G11B 17/24 360/92.1 |
| 5,943,305 | A * | 8/1999 | Fitzgerald | G11B 17/225 360/98.06 |
| 6,034,928 | A * | 3/2000 | Inoue | G11B 15/68 360/92.1 |
| 6,386,361 | B1 * | 5/2002 | Ting | G11B 33/0427 206/308.1 |
| 6,580,582 | B1 * | 6/2003 | Caverly | G11B 15/68 360/92.1 |
| 7,292,405 | B2 * | 11/2007 | Brace | G11B 15/6825 360/92.1 |
| 8,749,913 | B2 * | 6/2014 | Plutt | G11B 17/225 360/92.1 |
| 2002/0024896 | A1 | 2/2002 | Ogawa | |
| 2003/0217939 | A1 * | 11/2003 | Hegarty | G11B 33/045 206/308.1 |
| 2005/0024996 | A1 | 2/2005 | Schumacher | |
| 2005/0161367 | A1 * | 7/2005 | Matsutori | H01L 21/67369 206/711 |
| 2007/0102311 | A1 * | 5/2007 | Kirtz | G11B 33/0427 206/308.1 |
| 2011/0315566 | A1 * | 12/2011 | Boynton | A45C 11/16 206/6.1 |
| 2013/0347012 | A1 | 12/2013 | Maeda et al. | |

FOREIGN PATENT DOCUMENTS

| | | |
|---|---|---|
| CN | 1618099 | 5/2005 |
| EP | 1493151 A1 | 1/2005 |
| JP | 2002-074808 A | 3/2002 |
| JP | 2005-527059 A | 9/2005 |
| JP | 2011-204311 A | 10/2011 |
| JP | 2014-013639 A | 1/2014 |
| JP | 2014-096195 A | 5/2014 |
| WO | 2003/085663 A1 | 10/2003 |
| WO | 2016/208117 A1 | 12/2016 |

* cited by examiner

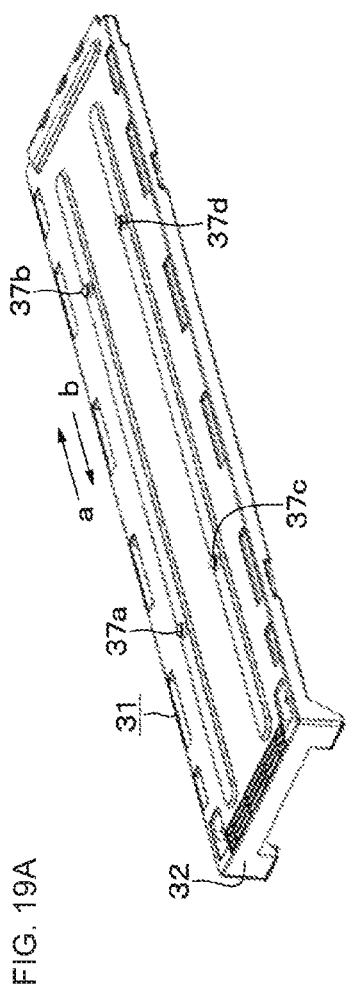
FIG. 19A
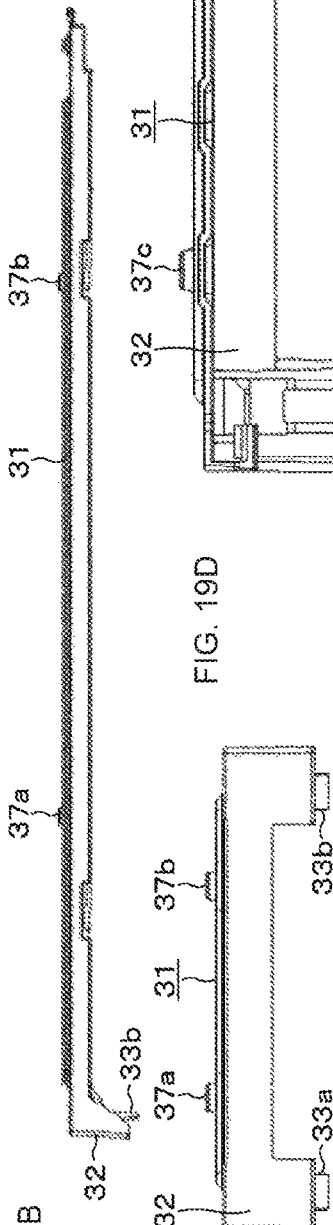
FIG. 19B
FIG. 19C
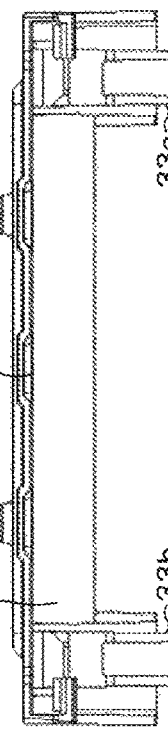
FIG. 19D
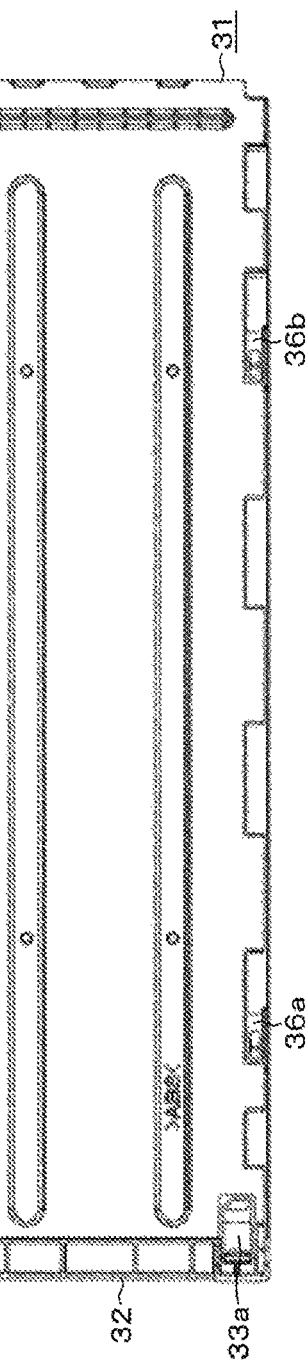
FIG. 19E

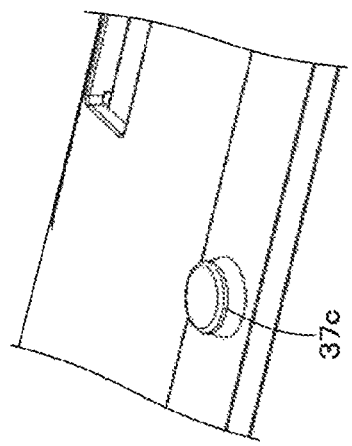
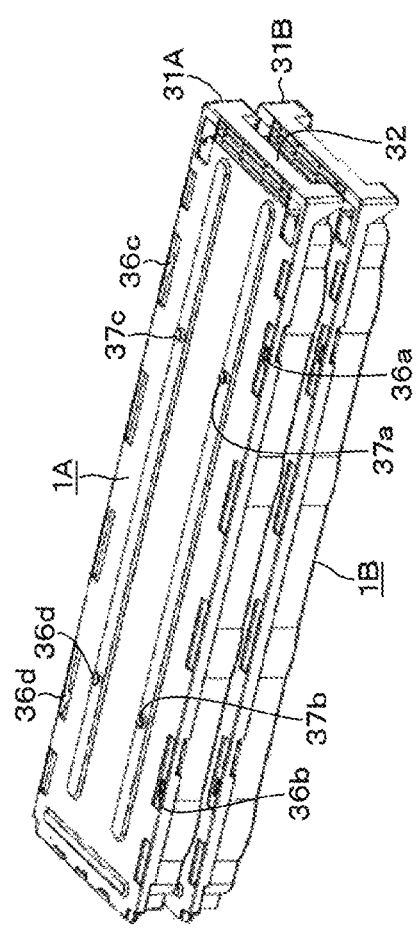
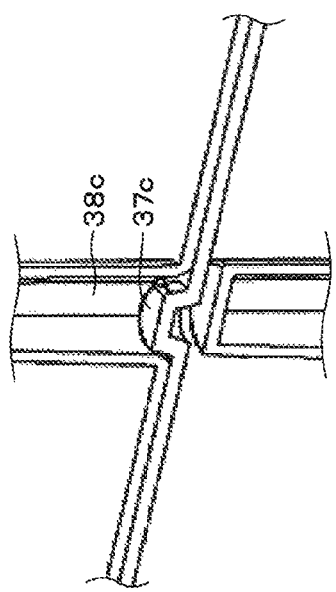
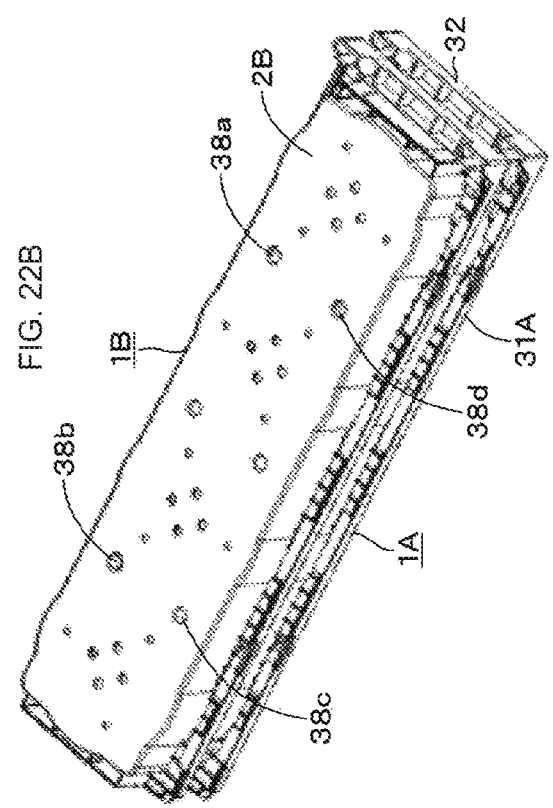

DISC STORAGE APPARATUS AND DISC ARCHIVE APPARATUS

CROSS REFERENCE TO RELATED APPLICATIONS

This application is a U.S. National Phase of International Patent Application No. PCT/JP2017/036427 filed on Oct. 6, 2017, which claims priority benefit of Japanese Patent Application No. JP 2016-234711 filed in the Japan Patent Office on Dec. 2, 2016. Each of the above-referenced applications is hereby incorporated herein by reference in its entirety.

TECHNICAL FIELD

The present technology relates to a disc storage apparatus and a disc archive apparatus that use high-capacity optical discs.

BACKGROUND ART

An archive apparatus that uses high-capacity optical discs (hereinafter referred to as "discs") has been in practical use. Examples of a storage apparatus in a data center include a storage apparatus that uses magnetic tapes as media. The discs are suitable for a cold archive aimed at long-term storage as compared with the magnetic tapes. For example, the following PTL 1 describes an archive apparatus capable of storing 12 discs in a magazine and handling the discs in units of magazines.

As described in PTL 1, storing 12 discs in one magazine has advantages in that the number of discs that can be accessed at a time increases and it is possible to record or reproduce a large amount of data at a time as compared with the case where discs are mounted in drives one by one. However, it is desired that a larger amount of data is recorded or reproduced in the data center.

The applicant of the present application has previously proposed a disc medium storage apparatus (hereinafter referred to as a disc tray as appropriate) in which a larger number of discs are stored in a case. This disc tray is capable of storing 64 (=4 rows×16) discs in the case with an upper surface thereof opened. The case has a box shape and is made of a synthetic resin. A large number of such disc trays are stored in a storage rack. A tray conveying robot takes out a predetermined disc tray from the storage rack and conveys the disc tray to disc drives so that the disc drives simultaneously record or reproduce data on/from the plurality of discs.

Normally, a disc tray once stored in the storage rack of the disc archive apparatus is not taken out from the rack. This is because there is a possibility that dust or the like enters into the storage rack from the outside. However, there may be a disc whose capacity has become full, a disc that has become defective, or a disc tray that has hardly been accessed and only needs to be stored off-line, for example. In consideration of this point, a dedicated storage rack is provided to take out a disc tray or mount a disc tray in a space of the storage rack from which a disc tray has been taken out. It is noted that although one possible consideration is to take out an unnecessary disc tray from a maintenance hatch provided in the storage rack, there is a risk that the internal discs jump out and scatter when the disc tray is tilted while being taken out.

CITATION LIST

Patent Literature

[PTL 1]
Japanese Patent Laid-Open No. 2014-13639

SUMMARY

Technical Problem

There has been a problem that even if slots dedicated to importing and exporting are provided, in a case where an upper side of the disc tray is open, tilting the taken out disc tray when taking out or mounting the disc tray results in falling of the internal discs.

Therefore, it is an object of the present technology to provide a disc storage apparatus and a disc archive apparatus capable of preventing internal discs from jumping out when a disc tray is taken out or mounted.

Solution to Problem

According to the present technology, a disc storage apparatus includes a case including an opening on an upper surface of the case and capable of storing N rows of stacked M disc-shaped recording media (N and M each indicate a positive integer of two or greater), a tray cover configured to slide from a rear end of the case and cover the opening, and a locking mechanism configured to lock a state of the opening being covered.

Preferably, the locking mechanism includes a lever provided in a vicinity of the rear end of the case, and a locking claw provided on the lever and configured to be engageable with/disengageable from the case by turn of the lever.

Further, according to the present technology, a disc archive apparatus includes: a disc storage apparatus capable of storing N rows of stacked M discs (N and M each indicate a positive integer of two or greater); first and second storage racks including a plurality of storage sections, each storage section having front and rear openings and configured to allow the disc storage apparatus to be mounted/taken out through the openings; a conveying robot configured to select the disc storage apparatus specified and convey the disc storage apparatus through the front opening of each of the first and second storage racks; a disc drive including a plurality of drives configured to perform recording on or reproducing from disc-shaped recording media in the disc storage apparatus conveyed by the conveying robot; and a disc conveying picker configured to set the discs from the disc storage apparatus into each of the drives of the disc drive. The disc storage apparatus stores N rows of stacked M disc-shaped recording media (N and M each indicate a positive integer of two or greater) in a case having an opening on an upper surface of the case, and in a case where the disc storage apparatus is taken out from the rear opening of one of the storage sections of the second storage rack, a tray cover slides from the rear opening and covers the opening and the disc storage apparatus is taken out with the tray cover covering the opening.

Advantageous Effects of Invention

According to at least one embodiment, since (N rows×M) disc-shaped recording media are stored in a disc tray, it is possible to increase the number of discs that can be handled at a time and to process a large amount of data in a short period of time. In addition, since a tray cover that slides from a rear end of a case and covers an opening is included, it is possible to prevent the disc-shaped recording media from jumping out of the case and scattering. It is noted that the effects described herein are not necessarily limited and may be any of the effects described in the present disclosure or effects different from the effects described in the present disclosure. Further, the content of the present invention are not interpreted as being limited by the effects exemplified in the following description.

BRIEF DESCRIPTION OF DRAWINGS

FIGS. 19A, 19B, 19C, 19D, and 19E depicts a perspective view, a side view, a front view, and a bottom view of the disc tray.

FIGS. 22A, 22B, 22C, and 22D depicts a perspective view, an enlarged perspective view, and an enlarged cross-sectional view used for describing positioning protrusions and positioning holes of the disc tray.

DESCRIPTION OF EMBODIMENTS

The embodiments described below are preferable specific examples of the present technology and technically preferable various limitations are given. However, the scope of the present technology is not limited to these embodiments unless description of limiting the present technology is particularly given in the following description.

It is noted that description of the present technology will be given in the following order.
<1. Embodiment>
<2. Modification>

1. Embodiment

"Disc Archive Apparatus"

A disc archive apparatus to which the present technology can be applied will be described. This apparatus uses high-capacity optical discs as discs. For example, high-density optical discs such as Blu-ray (registered trademark) discs (BDs) can be used as the discs. A BD is a high-density optical disc having a recording capacity of approximately 25 Gbytes in a case where the BD is a single-sided, single-layer disc, and approximately 50 Gbytes in a case where the BD is a single-sided, double layer disc. In the BD standard, the light source wavelength is 405 nm and the numerical aperture (NA) of an objective lens is large, i.e., 0.85, in order to reduce the beam spot diameter. In addition, in recent years, BDXL (registered trademark) has been in practical use. Compared with the Blu-ray (registered trademark) disc (BD), the BDXL has a short channel bit length, that is, mark length, and a high density in the line density direction, thereby achieving a high capacity of 100 Gbytes with three layers and 128 Gbytes with four layers. In addition, a disc employing a method of recording data on both groove tracks and land tracks (referred to as a land/groove recording method as appropriate) has been proposed to further increase the recording capacity. In this case, it is possible to achieve a higher capacity.

Figure 1A:
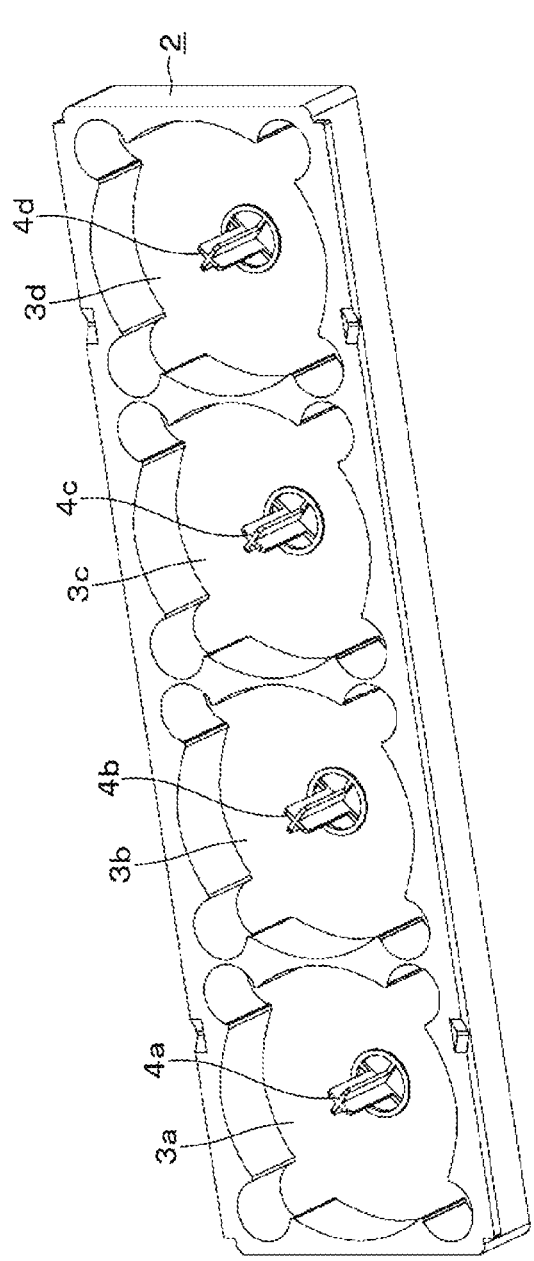
FIGS. 1A and 1B depicts perspective views used for describing a disc tray.
Figure 1B:
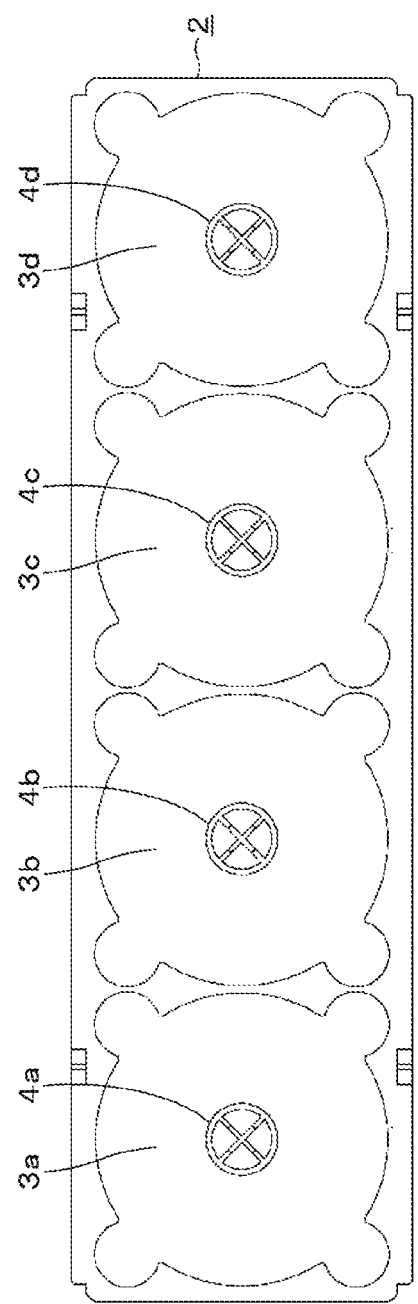

As an example, four storage recess sections 3a to 3d (referred to as storage recess sections 3 in a case where the individual storage recess sections do not need to be distinguished from each other) are formed in line in a case 2 as depicted in FIGS. 1A and 1B. The case 2 includes a synthetic resin and has a box shape with an upper surface thereof open. Each storage recess section 3 is a recess section that has substantially the same shape as the outer shape of a disc and includes a corresponding one of center poles 4a to 4d (referred to as center poles 4 in a case where the individual center poles do not need to be distinguished from each other) erected at the center. That is, N rows (for example, N=4) of discs 5 are stored.

Figure 2:
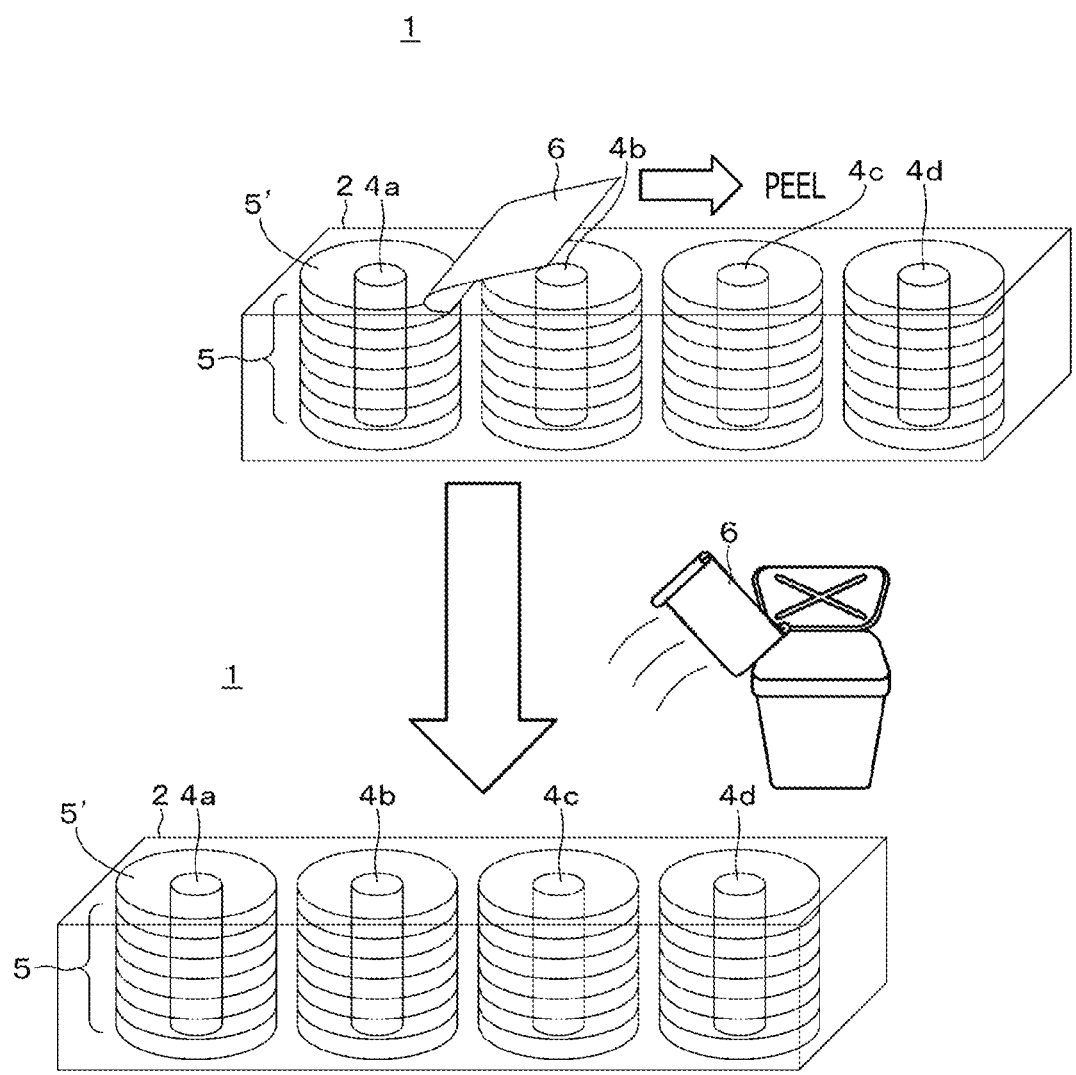
FIG. 2 is a perspective view used for describing the disc tray.

As depicted in FIG. 2, in each storage recess section 3 (each row), M (for example, M=16) discs 5 are stacked and stored, and a disc cover is stacked on the top as described later. Each center pole 4 penetrates openings at the center of the discs. In addition, an upper opening of the case 2 is covered by a transparent or translucent resin film 6 after the discs 5 are stored. A disc storage container that stores the discs and is sealed with the film 6 in this manner will be referred to as a disc tray 1. It should be noted that the film 6 is peeled from the case 2 and discarded at the time of use. Sealing the opening with the film 6 can prevent dust from adhering to the discs 5 and assure that the discs 5 are not used. In addition, security can be improved more by using the film 6 that leaves trace in a case where the film 6 is replaced. In addition, after the film 6 is peeled off, the disc cover (not depicted) placed on the top of the stacked discs 5 prevents floating dust particles from adhering to the discs 5 used for data storage.

The disc cover is placed on the top of the plurality of discs 5 stored in the disc tray 1, preventing dust from adhering to the discs 5. A slight gap exists between an upper surface (open surface) of one disc tray 1 and a bottom surface of another disc tray 1 positioned above the one disc tray 1 in a case where the disc trays 1 are stored in a shelf of a disc tray rack. In a case where the disc tray rack is subjected to large vibrations such as an earthquake, there is a risk that the discs jump out of the disc tray 1 and fall.

Figure 3A:
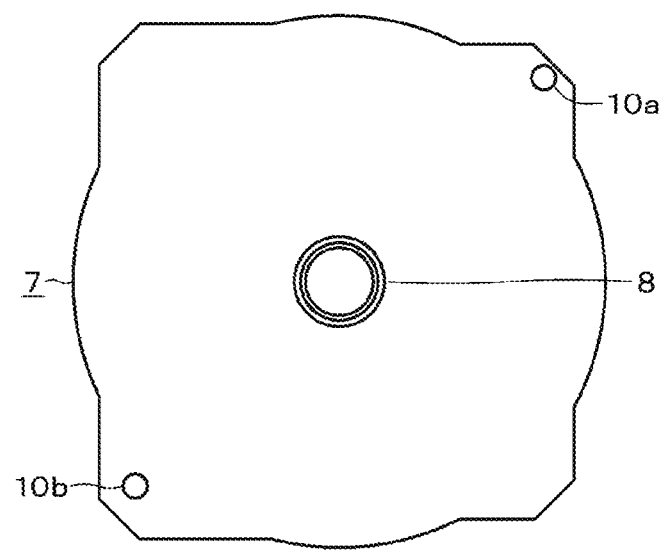
FIGS. 3 A, 3B, and 3C depicts a plan view, a bottom view, and a perspective view of an example of a disc cover.
Figure 3B:
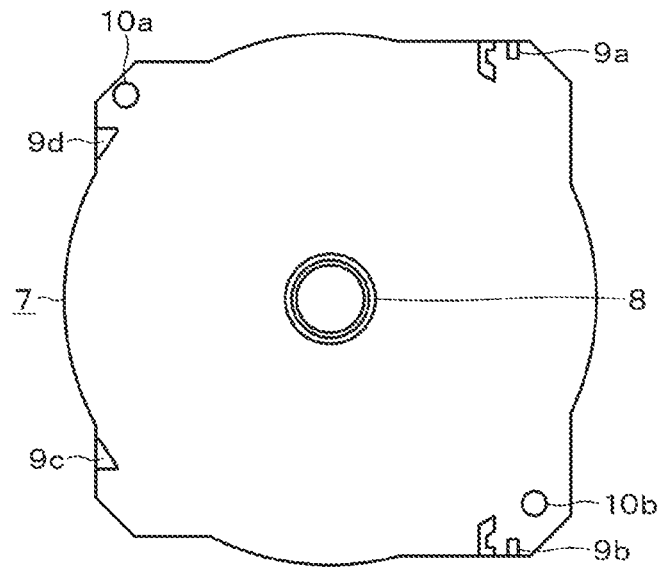
Figure 3C:
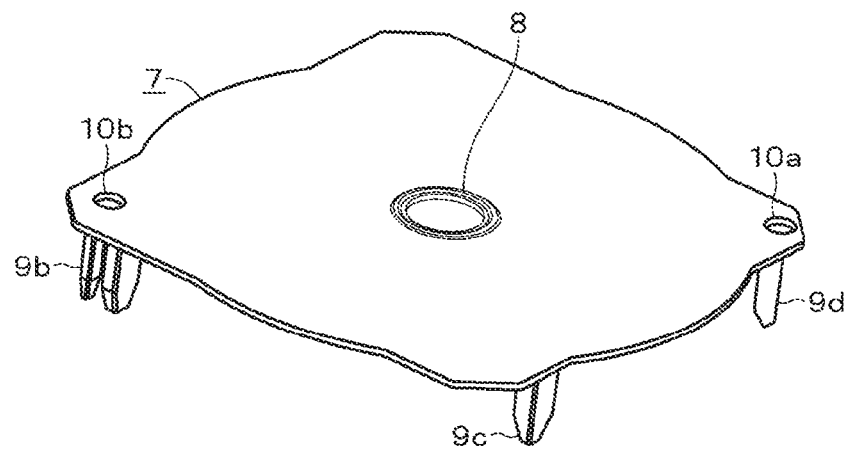

As an example, a disc cover 7 as depicted in FIGS. 3A, 3B, and 3C are used. The disc cover 7 includes a central opening 8, leg sections 9a, 9b, 9c, and 9d, and holes 10a and 10b. The central opening 8 is similar to that of the disc 5 and formed on a main surface of the disc cover 7. The leg sections 9a, 9b, 9c, and 9d (referred to as leg sections 9 in a case where the individual leg sections do not need to be distinguished from each other) protrude from outer four corners of a back surface of the disc cover 7. The holes 10a and 10b are formed in two positions in the diagonal direction.

Figure 4:
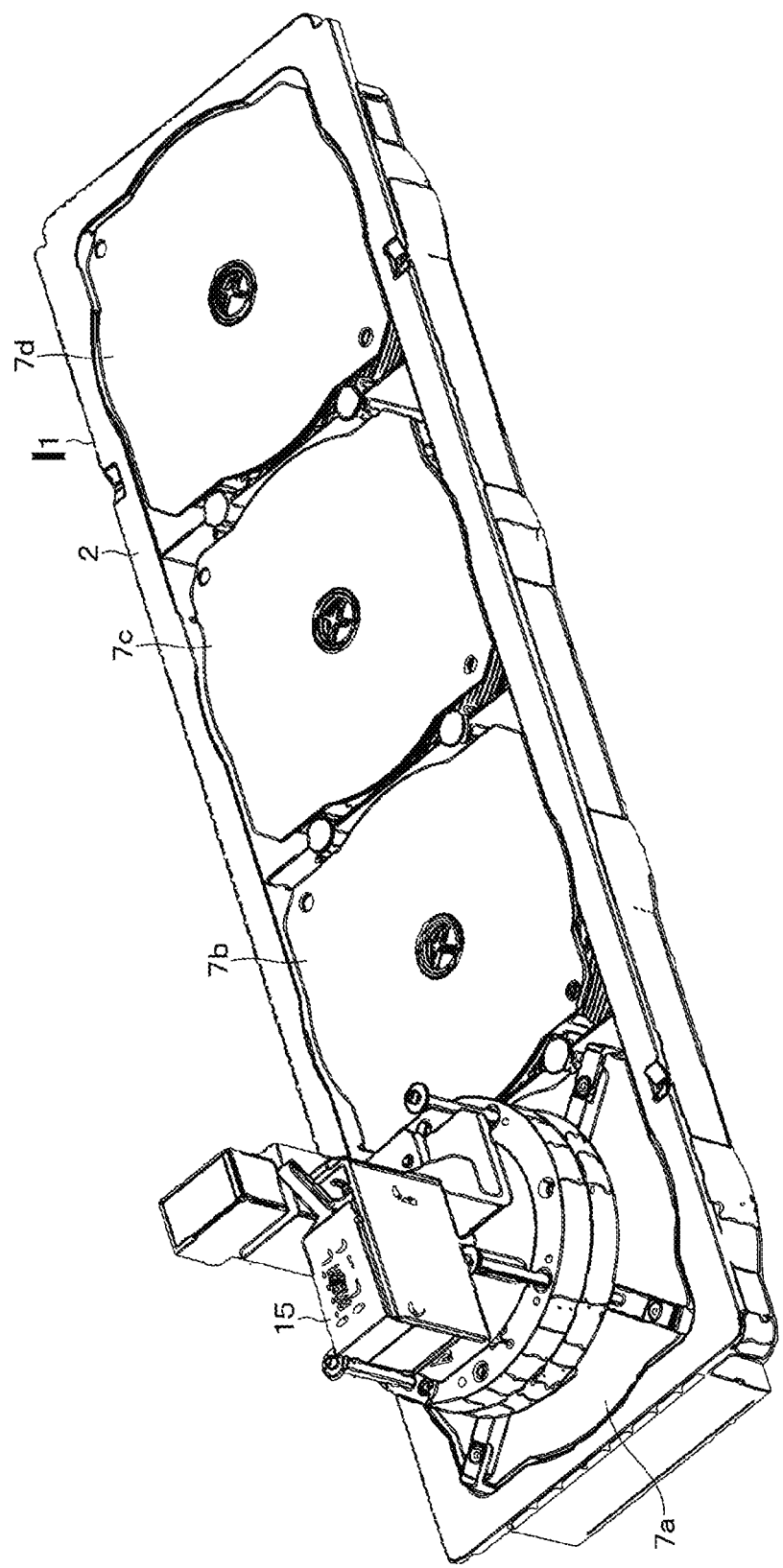
FIG. 4 is a perspective view of the disc tray with the disc cover mounted thereon.

As depicted in FIG. 4, disc covers 7a, 7b, 7c, and 7d cover the surfaces of the discs stacked in the respective storage recess sections of the case 2 of the disc tray 1. The above-described leg sections 9 are each engaged with a part, for example, a protrusion formed in each storage recess section. The length of each leg section 9 is slightly greater than the width of the gap generated between the upper surface of one disc tray 1 and the bottom surface of another disc tray 1 positioned above the one disc tray 1 in a case where the disc trays 1 are stored in the disc tray rack. Since such leg sections 9 are included, even in a case where the disc covers 7a to 7d vibrate, it is possible to prevent the disc covers 7a to 7d from falling through the gap. It is noted that it is possible to prevent the discs from falling not only in a state where the disc tray 1 is stored in the disc tray rack but also in a case where the disc tray 1 is conveyed by a tray conveying robot.

In addition, taper pins (not depicted) are inserted into the holes 10a and 10b. The taper pins are formed on a lower side of an arm section of each picker 15. The taper pins are engaged with the holes 10a and 10b, thereby preventing the disc covers 7a to 7d from rotating.

Figure 5:
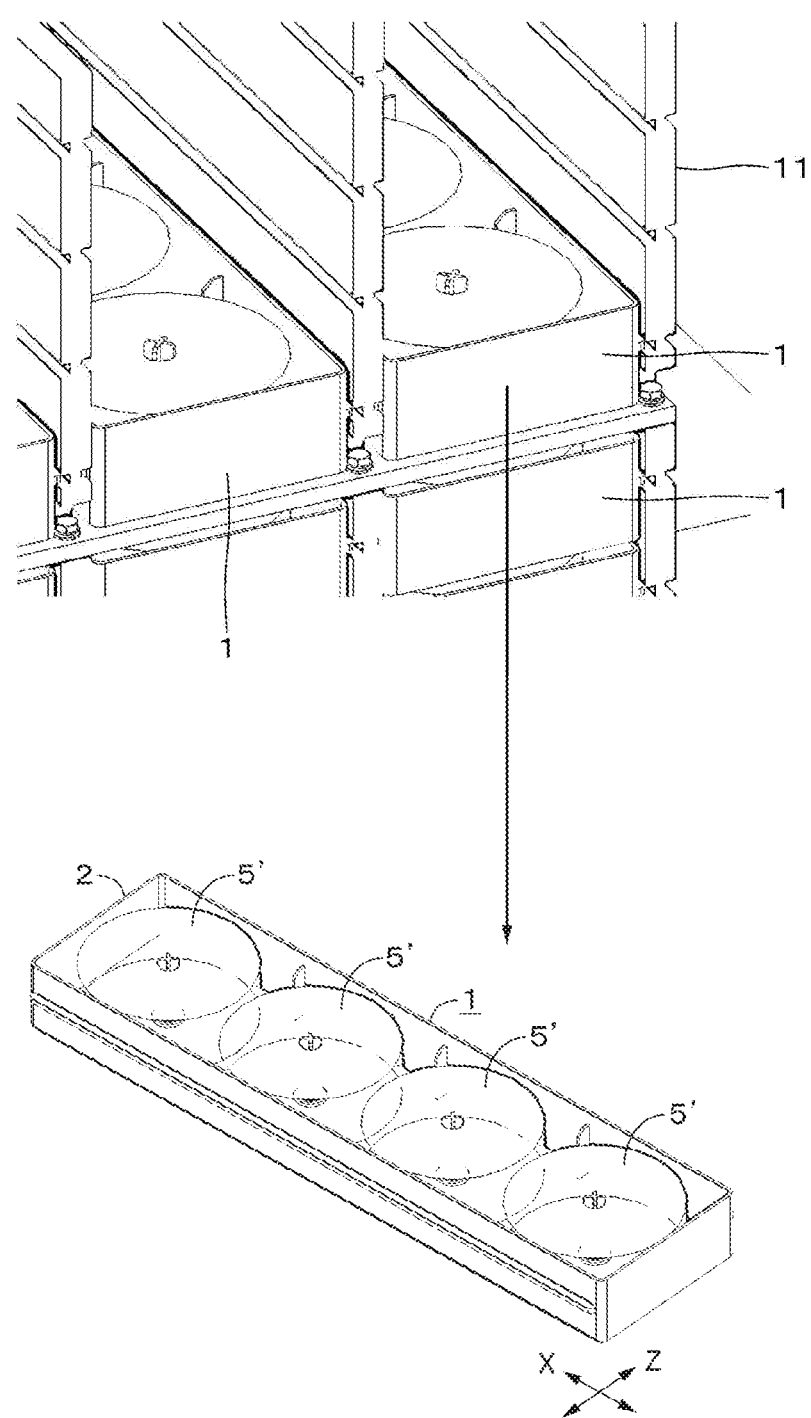
FIG. 5 is a perspective view used for describing the disc tray and a disc tray rack.
Figure 6:
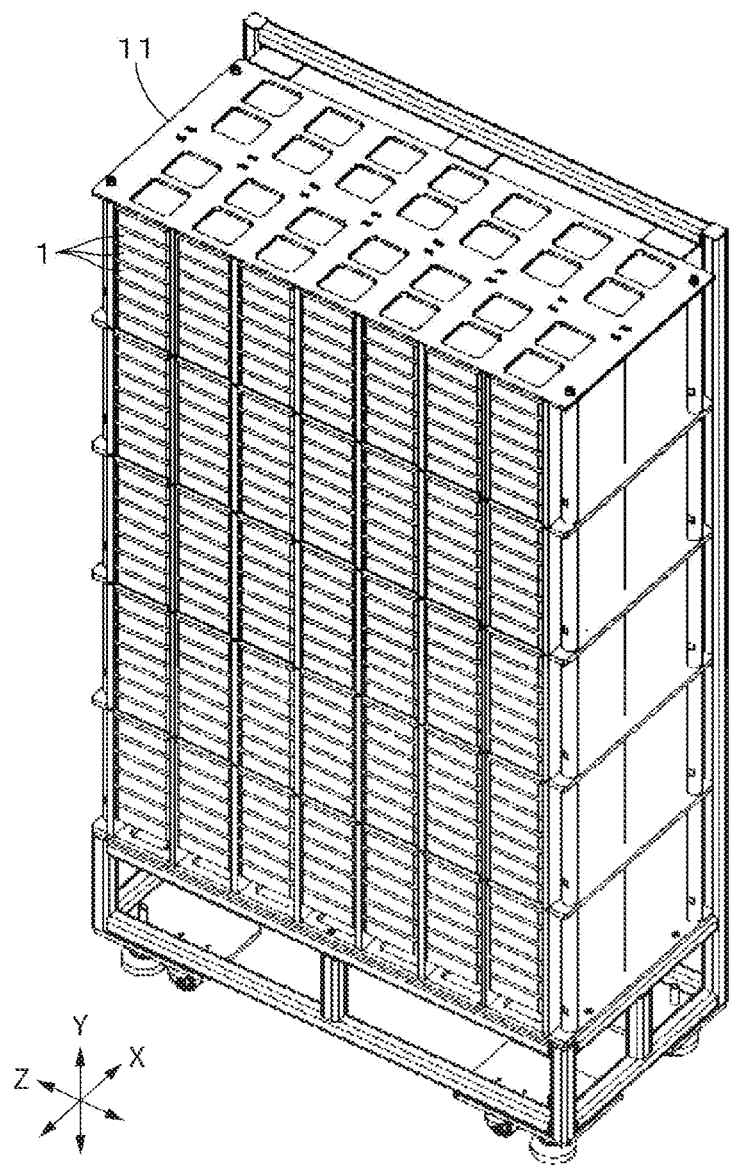
FIG. 6 is a perspective view used for describing the disc tray rack.

As depicted in FIG. 5, the disc tray 1 from which the film 6 has been peeled off is set in each storage section of a first storage rack (hereinafter abbreviated as "tray rack" as appropriate) 11. It is noted that hereinafter, the disc cover 7 on the top of the stacked discs will not be depicted. The length direction of the disc tray 1 is an X direction and the width direction of the disc tray 1 is a Z direction. As an example, as depicted in FIG. 6, the tray rack 11 has a depth dimension slightly greater than the length of the disc tray 1 and is wide enough to arrange and store seven disc trays 1 side by side.

The disc tray rack 11 includes a plurality of storage sections partitioned by five shelves. The disc tray 1 is mounted in each storage section. In the lowermost shelf, storage sections for six disc trays 1 are provided in a Y direction, and seven sets of six storage sections are arranged in the Z direction. That is, the storage sections that can mount a maximum of 42 disc trays 1 are provided. In each of the other shelves, storage sections for seven disc trays 1 are provided, and seven sets of seven storage sections are arranged in the Z direction. The storage sections that can mount a maximum of 49 disc trays 1 are provided. Therefore, one disc tray rack 11 can store a maximum of 238 (=42+49×4) disc trays 1.

Each storage section of the tray rack 11 has front and rear openings and a storage space slightly larger than the disc tray 1. An inner side (hereinafter referred to as "front side") of each storage section is opened such that the disc tray 1 can be taken out by the tray conveying robot. An outer side (hereinafter referred to as "rear side") of the storage section is provided with a door that covers the opening. As described later, the conveying robot moves in the Z direction along a front surface of the tray rack 11 and takes out the intended disc tray 1 on the basis of identification information such as, for example, a barcode. Further, an operator can first set the disc tray 1 in the storage section of the tray rack 11 from the rear opening of the storage section by opening the door on the rear side of the tray rack 11.

Figure 7:
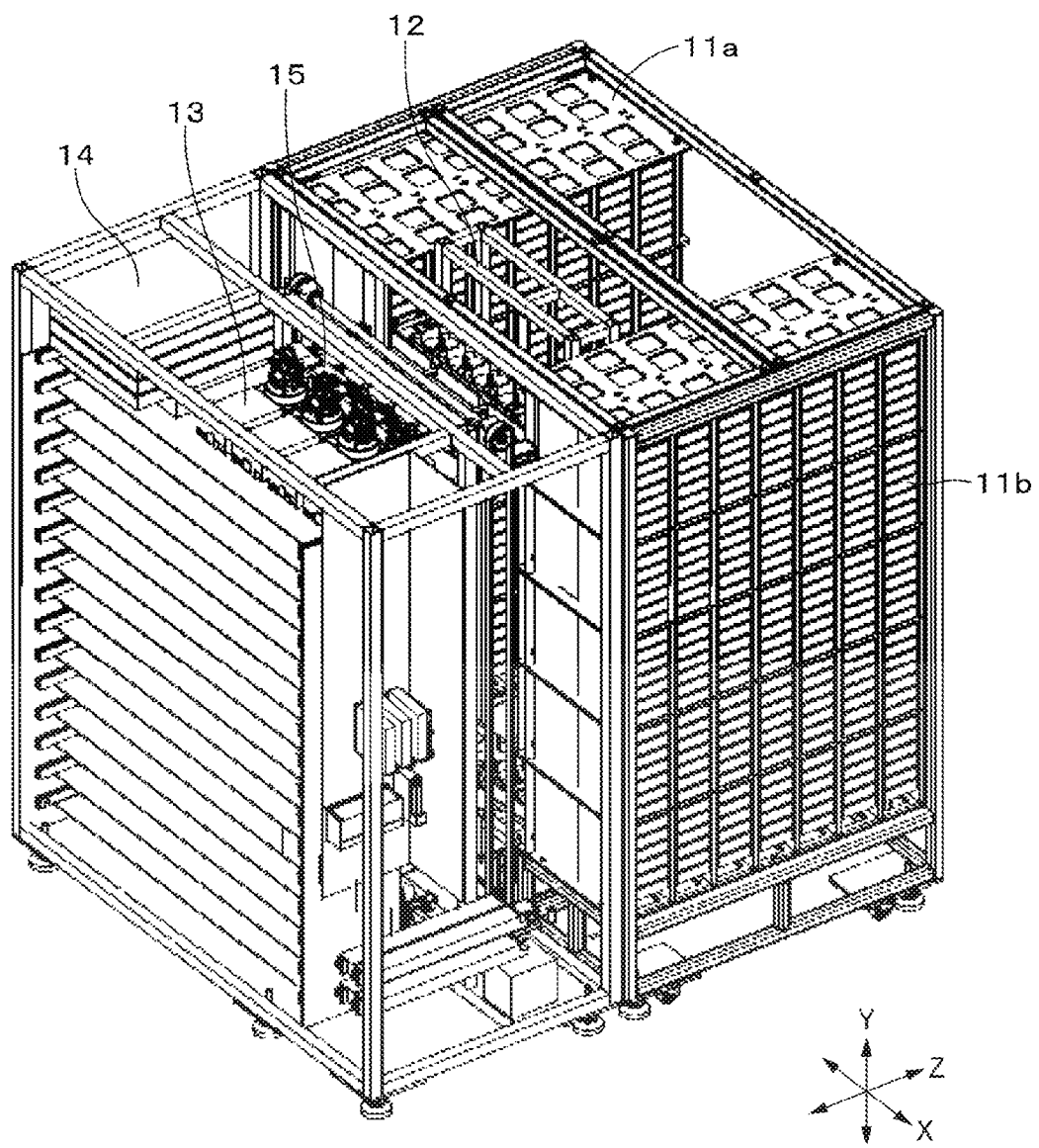
FIG. 7 is a perspective view depicting an entire disc archive apparatus.
Figure 8:
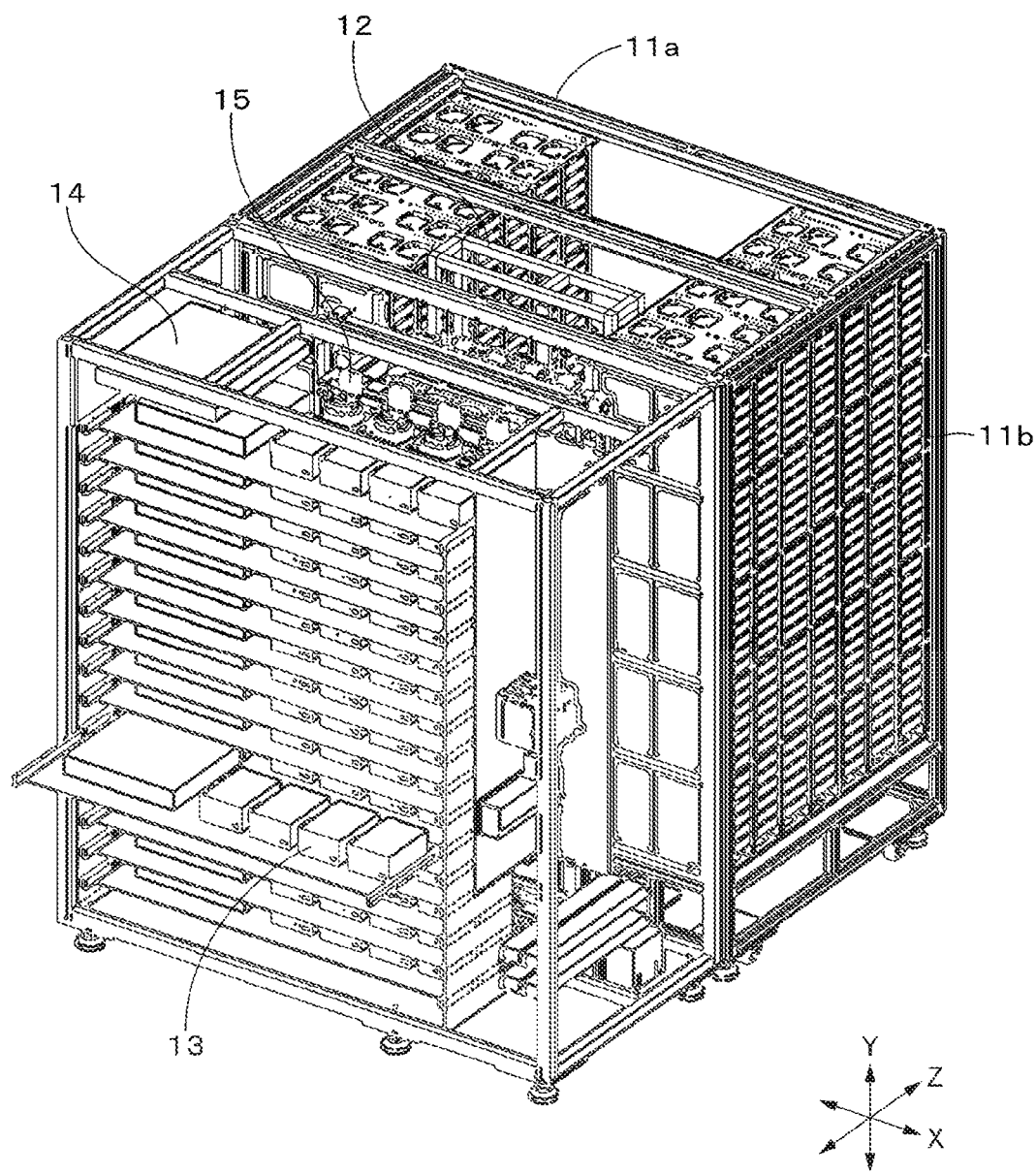
FIG. 8 is a perspective view depicting the entire disc archive apparatus.
Figure 9:
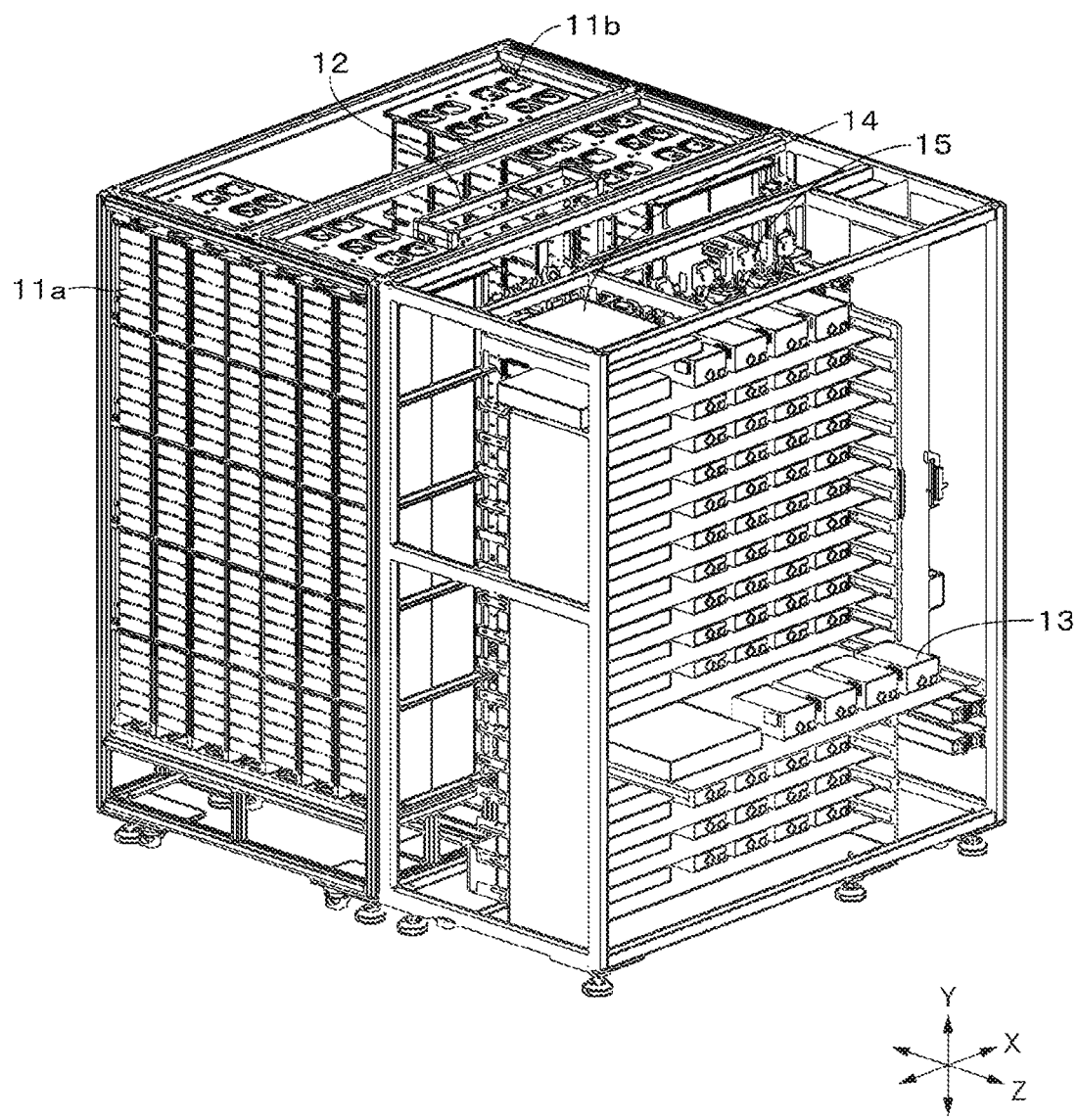
FIG. 9 is a perspective view depicting the entire disc archive apparatus.

FIGS. 7, 8, and 9 are perspective views of the appearance of the entire system of the disc archive apparatus to which the present technology can be applied. The system mainly includes tray racks 11a and 11b described above, a tray conveying robot 12, a disc drive 13, an electric circuit section 14, disc conveying pickers 15, and a turntable 16. The electric circuit section 14 includes a controller for controlling the entire system, a power supply circuit, and the like. A configuration including one tray rack 11 is the minimum configuration. Joining the tray racks 11 to each other in the Z direction can increase the number of tray racks 11.

A space in which the tray conveying robot 12 travels is formed between the opposing tray racks 11a and 11b. The tray conveying robot 12 is guided by, for example, a lower trolley wire or a lower rail, and traveled by a driving source such as an electric motor. The tray conveying robot 12 can stop at a desired position by a position sensor. In addition, a barcode reader included in the tray conveying robot 12 can read a barcode displayed on the surface of the case 2 of the disc tray 1. The specified disc tray 1 is taken out from the tray rack 11a or 11b and conveyed to the vicinity of the disc conveying pickers 15.

Figure 10:
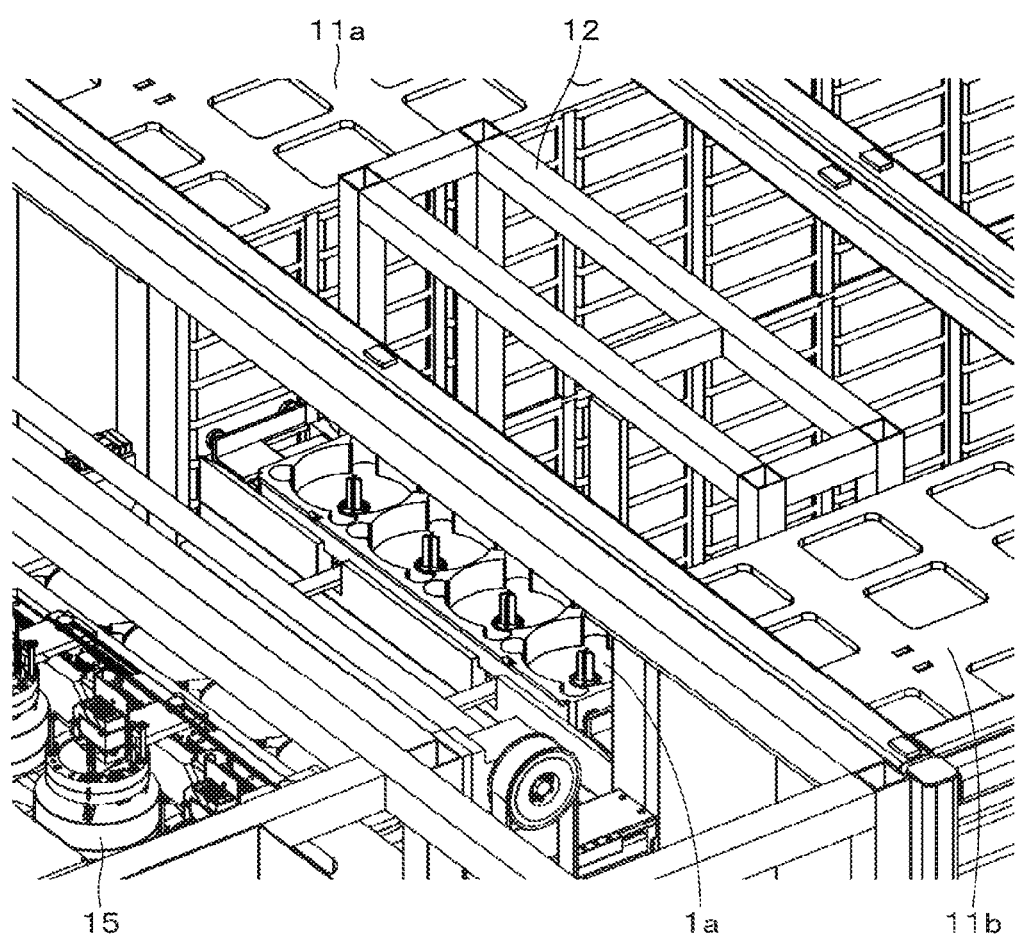
FIG. 10 is a perspective view depicting a part of the disc archive apparatus.
Figure 11:
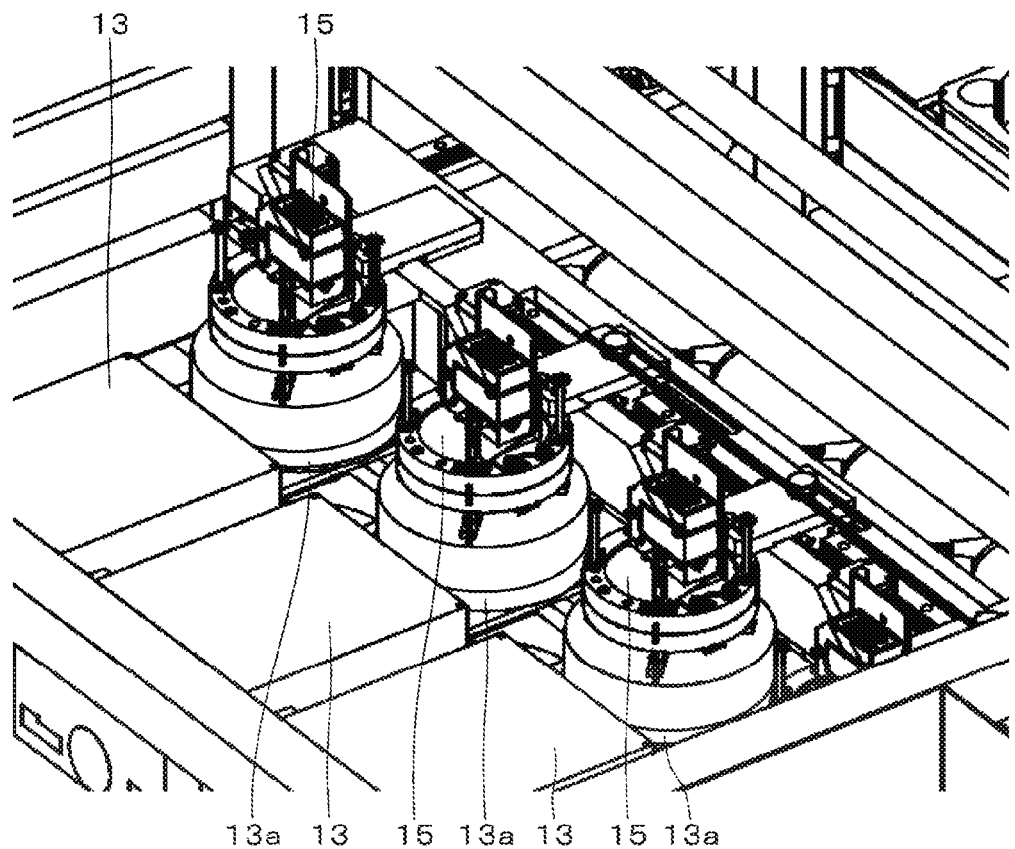
FIG. 11 is a perspective view depicting a part of the disc archive apparatus.
Figure 12:
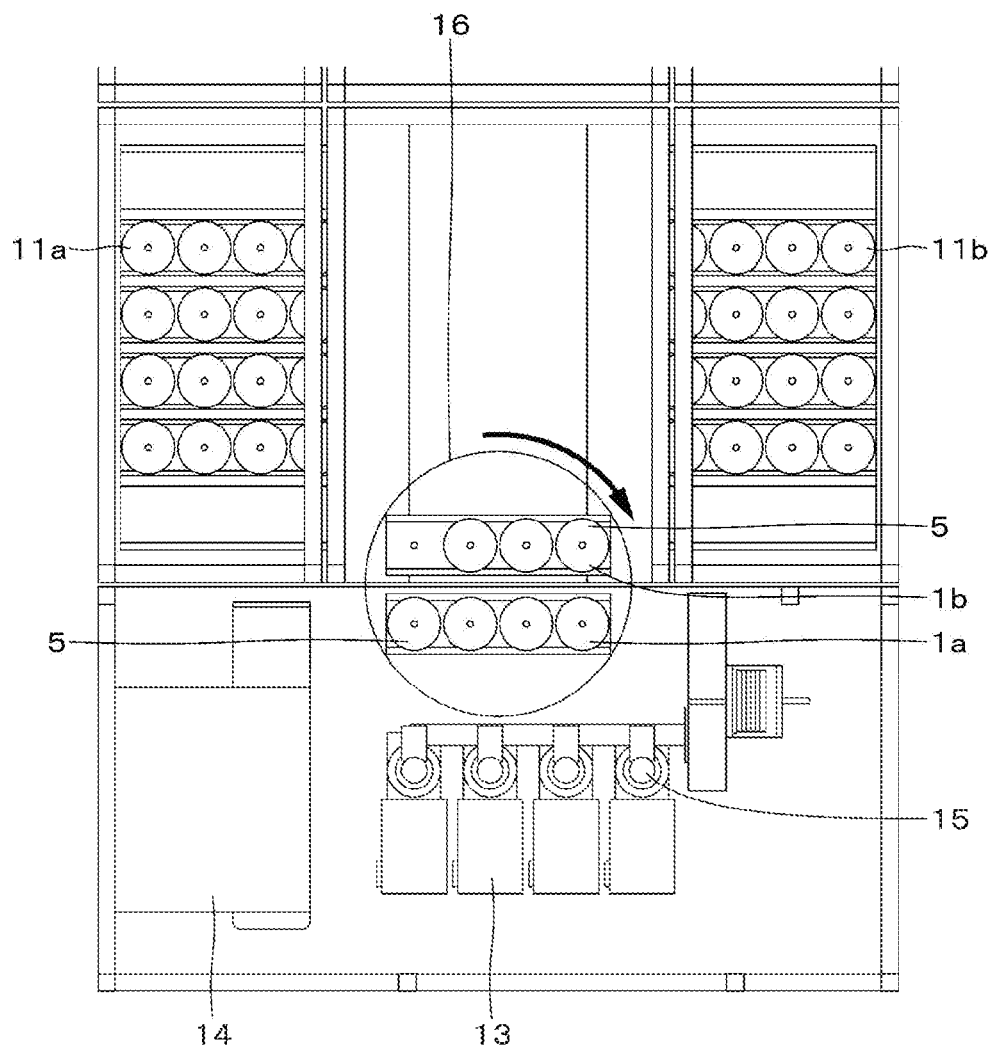
FIG. 12 is a plan view of the disc archive apparatus.

The disc conveying pickers 15 and the turntable 16 are provided to receive and deliver the discs between the tray conveying robot 12 and the disc drive 13. FIG. 10 depicts an enlarged part of the disc tray 1 on the tray conveying robot 12 and the disc conveying pickers 15. FIG. 11 depicts an enlarged part of the disc conveying pickers 15. FIG. 12 depicts the turntable 16.

The turntable 16 is turnable as indicated by an arrow in FIG. 12. A first area and a second area for placing two disc trays 1a and 1b are set in the turntable 16. The turntable 16 is divided into two with the diameter thereof serving as a boundary, whereby the first area and the second area having a semicircular shape are formed. The disc trays 1a and 1b can be placed in the first area and the second area, respectively.

The turntable 16 makes a half turn from the position depicted in FIG. 12 such that the positions of the disc tray 1a and the disc tray 1b are switched. Then, the disc conveying pickers 15 take out all the discs 5 from the disc tray 1a on the turntable 16. The disc tray 1a is on the side closer to the disc drive 13.

The disc drive 13 is an apparatus that records or reproduces information on/from the discs 5. In the disc drive 13, each disc 5 is placed on a drive tray 13a ejected from the main body. Next, the drive tray 13a is inserted into the main body, and the discs 5 are placed on the turntable 16 turned by a spindle motor. Then, data is recorded on or reproduced from the discs 5 by an optical pickup. The disc drive 13 includes sixteen sets of drives arranged in the Y direction. Each set includes four drives arranged in the X direction. That is, the disc drive 13 can simultaneously perform recording on or reproduction from a maximum of 64 discs 5 stored in one disc tray.

The disc conveying pickers 15 move to above the opening of the case of the disc tray 1a, take out all the (4 rows×16) discs 5 stored in one disc tray 1a from a lower side of the case, and hold the discs 5. Each disc conveying picker 15 conveys the discs 5 taken out to a position immediately above the corresponding tray ejected from each of the four drives arranged in one stage of the disc drive 13. Since the interval between the four discs 5 in the disc tray 1a is different from the interval between drive shafts of the four drives, the disc conveying pickers 15 adjust, for example, enlarge the interval between the four discs 5 taken out and convey the discs 5 to immediately above the respective trays.

In a case where the discs 5 are to be loaded into the disc drive 13, the drive trays 13a of the four drives located at the lowest position of the disc drive 13 are ejected, and the disc conveying pickers 15 convey the stacked discs 5 to immediately above the respective drive trays 13a. Then, each lowest disc (total of four in the four rows) among the discs held by the corresponding disc conveying picker 15 is separated, and each separated disc 5 is placed on the corresponding one of the drive trays 13a. The placed disc is loaded into the corresponding drive when the drive tray 13a is drawn in.

Next, the disc conveying pickers 15 move upward (in the Y direction) and the drive trays 13a are ejected from the respective four drives located at the second lowest position of the disc drive 13. Each disc (total of four in the four rows) located at the second lowest position among the discs held by the corresponding disc conveying picker 15 is separated and is placed on the corresponding one of the drive trays 13a. The placed disc is loaded into the corresponding drive when the drive tray 13a is drawn in.

After that, a similar operation is repeated. Each top disc (total of four in the four rows) among the held discs is placed on the tray ejected from the corresponding one of the top drives. The placed disc is loaded into the corresponding drive when the tray is drawn in. In this manner, the (4 rows×16) discs 5 stored in one disc tray are loaded into the respective (4×16 sets) drives of the disc drive 13.

Under the control of the controller for controlling the system, after completion of the process including recording on or reproducing from the discs taken out from the current disc tray 1a on the first area of the turntable 16, the turntable 16 is half-turned and a process including recording on or reproducing from the next disc tray 1b placed on the second area of the turntable 16 is performed.

In addition, under the control of the controller, while the process including recording on or reproducing from the discs taken out from the current disc tray 1a on the first area of the turntable 16 is being performed, the tray conveying robot 12 selects the next disc tray 1b and places the selected next disc tray 1b on the second area of the turntable 16.

That is, the disc tray 1b to be used next is placed on the surface on the opposite side of the turntable 16 while information is being recorded on or reproduced from the discs 5 of the disc tray 1a. This allows preparation for switching from the disc tray 1a to the disc tray 1b. That is, after completion of recording on or reproduction from the discs 5 stored in the disc tray 1a, the disc conveying pickers 15 unload the (4 rows×16) discs 5 from the disc drive 13.

Contrary to loading, unloading starts from the top four drives. Then, the unloaded discs 5 are returned to the disc tray 1a, and then the disc tray 1a is placed on the turntable 16. Next, the turntable 16 makes a half turn, and the disc conveying pickers 15 load the discs 5 in the disc tray 1b into the respective drives of the disc drive 13.

"Operation of Switching Disc Trays"

Figure 13:
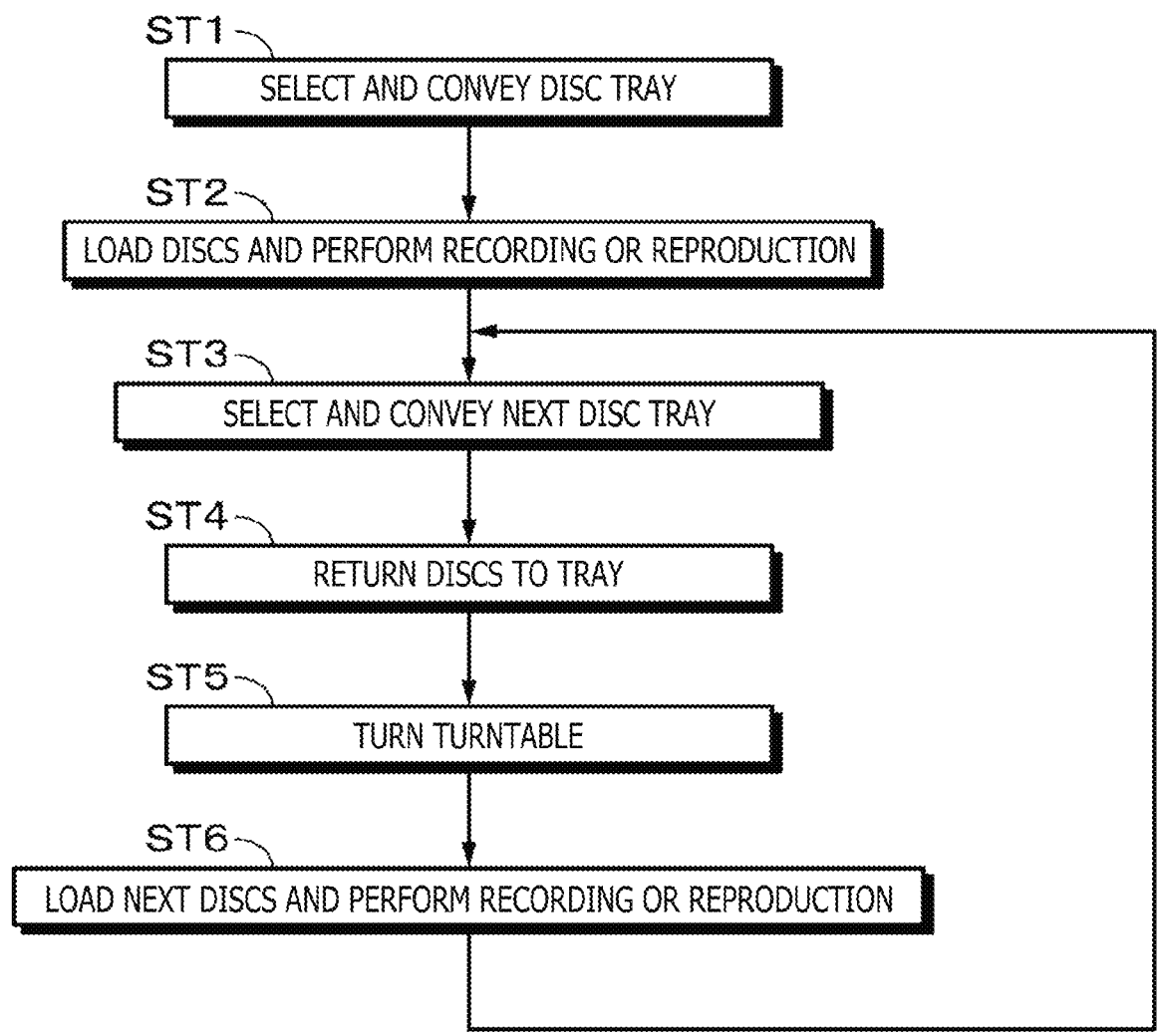
FIG. 13 is a flowchart depicting a flow of a process of the disc archive apparatus.

An operation of switching the disc trays will be briefly described with reference to a flowchart in FIG. 13. It is assumed that in the initial state, no disc tray is placed on the turntable 16.

Step ST1: A disc tray (for example, the disc tray 1a) is selected and the selected disc tray is conveyed by the tray conveying robot 12.

Step ST2: The discs 5 are loaded into the disc drive 13 by the disc conveying pickers 15. Then, the disc drive 13 performs recording on or reproduction from the loaded discs 5.

Step ST3: While the recording or reproduction is being performed on or from the discs 5 in the first disc tray 1, the next disc tray (for example, the disc tray 1b) is selected and the selected next disc tray is conveyed by the tray conveying robot 12. The next disc tray is placed on the turntable 16.

Step ST4: After completion of recording or reproduction, the discs 5 are returned to the first disc tray by the disc conveying pickers 15.

Step ST5: The turntable 16 is half-turned, and the next disc tray is positioned in the vicinity of the disc conveying pickers 15.

Step ST6: The discs 5 in the next disc tray are loaded into the disc drive 13 by the disc conveying pickers 15. Then, the disc drive 13 performs recording on or reproduction from the loaded discs 5. Then, the process returns to step ST3 (in addition, selection and conveyance of the next disc tray), and the above-described process is repeated.

"IE Station"

In the disc archive apparatus (library system) that stacks and manages the discs 5 by self weight in the disc tray 1 as described above, after the disc tray 1 is installed in the tray rack 11, the disc tray 1 including the media cannot be taken in or out of the system as the specification. Thus, according to one embodiment of the present technology, in a case where an error has occurred, in a case where a disc in the library is to be brought out of the device, or in a case where a tray with a low access frequency is to be managed off-line, for example, the disc tray 1 can be taken in and out of the system. In addition, in a case where the disc tray 1 is taken in or out and the tray is tilted due to a human error, the internal discs are prevented from scattering and a risk of damaging data is prevented.

According to one embodiment of the present technology, a second tray rack can be provided in a part of the library system and a disc tray storing the discs can be managed off-line. The second tray rack is dedicated to importing and exporting. Further, with a structure with which a cover can be mounted before the disc tray is pulled out from the second tray rack, it is possible to prevent the discs from falling even in a state where the tray has been taken out to the outside of the device. In addition, it is possible to improve the safety with a locking mechanism that prevents jumping out, a mechanism that prevents reverse insertion, and a structure with which the cover cannot be separated unless the operation is performed with both hands. Further, it is possible to stack the disc trays off-line by providing positioning protrusions for stacking.

Normally, the disc tray 1 that has been inserted into the tray rack 11 is not taken out. A dedicated tray rack is provided to, for example, replace a disc tray including a disc that has become defective during use, replace a disc tray including a disc whose capacity has become full, and take out a disc tray to be managed off-line. The second tray rack dedicated to taking out (exporting) and mounting (importing) of the disc tray will be hereinafter referred to as "IE station".

Figure 14C:
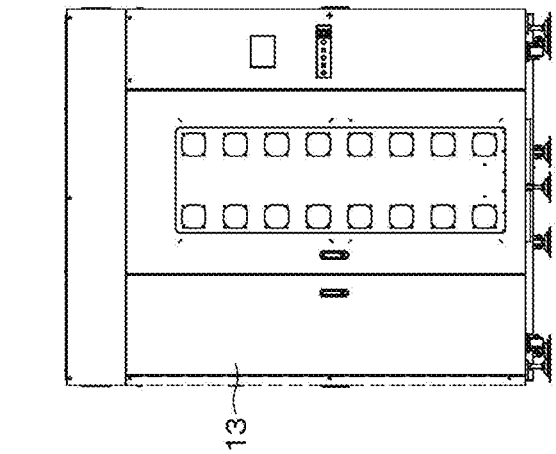
FIGS. 14A, 14B, and 14C depicts a perspective view, a side view, and a front view depicting the entire disc archive apparatus according to one embodiment of the present technology.
Figure 14A:
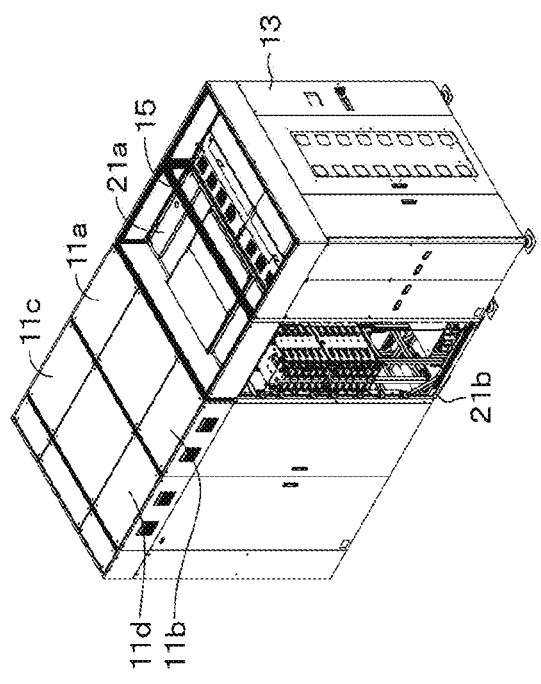
Figure 14B:
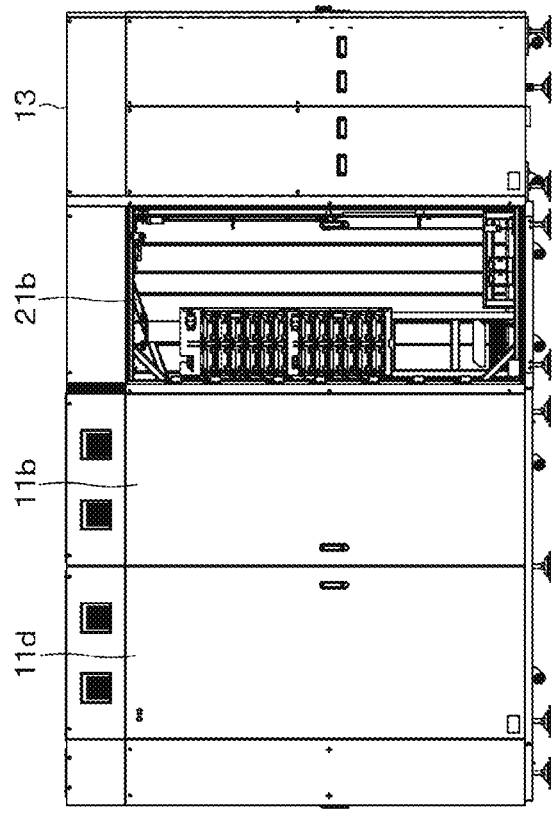

As depicted in FIGS. 14A, 14B, and 14C, each of IE stations 21a and 21b is interposed between the tray racks 11a and 11b and the disc conveying pickers 15 (turntable 16). In a case where the IE stations 21a and 21b do not need to be distinguished from each other, the IE stations 21a and 21b will be referred to as IE stations 21.

Figure 15C:
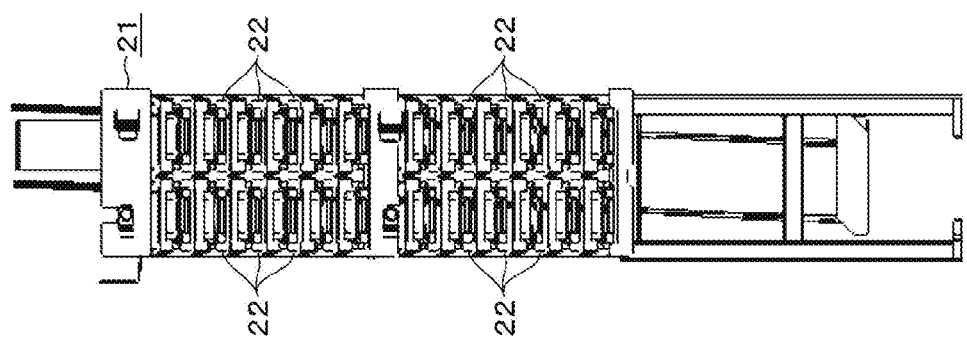
FIGS. 15A, 15B, and 15C depicts a perspective view, a side view, and a front view of an IE station.
Figure 15B:
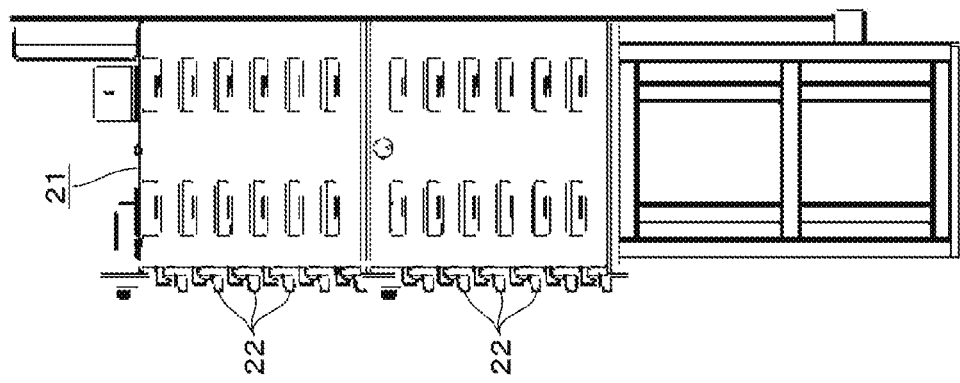
Figure 15A:
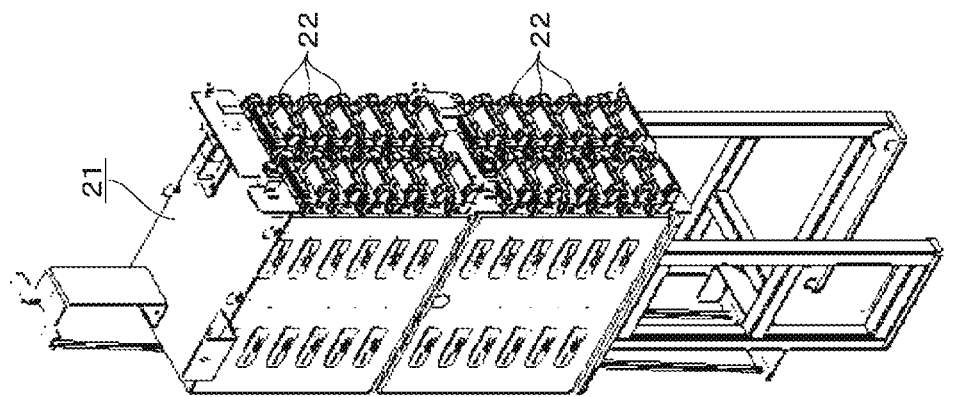

As depicted in FIGS. 15A, 15B, and 15C, the IE station 21 (21a and 21b) has a configuration of two units stacked in the vertical direction. Each unit includes 12 (=2 rows×6 stages) storage sections. It should be noted that the IE station 21 may have a configuration in which slots are arranged in one row or three or more rows, or may have a configuration including the storage sections with stages other than six stages. The disc tray 1 can be mounted/taken out from front and rear openings of the IE station 21. The tray conveying robot 12 mounts and takes out the disc tray 1 from an inner side (hereinafter referred to as "front side") of each storage section. A guide rail for guiding the disc tray 1 is provided inside each storage section. The disc tray 1 can slide on the guide rail, so that the disc tray 1 can be taken in and out through the openings of the storage section.

Figure 16B:
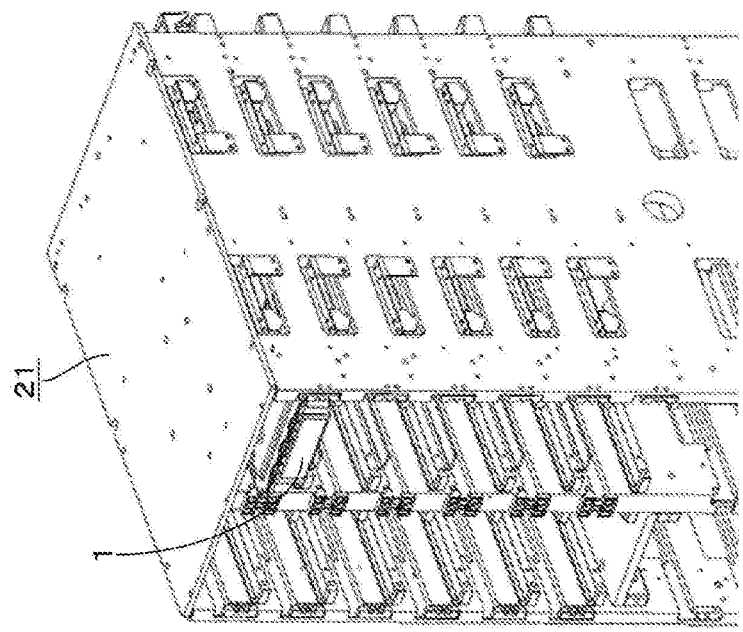
FIGS. 16A and 16B depicts perspective views of a part of the IE station.
Figure 16A:
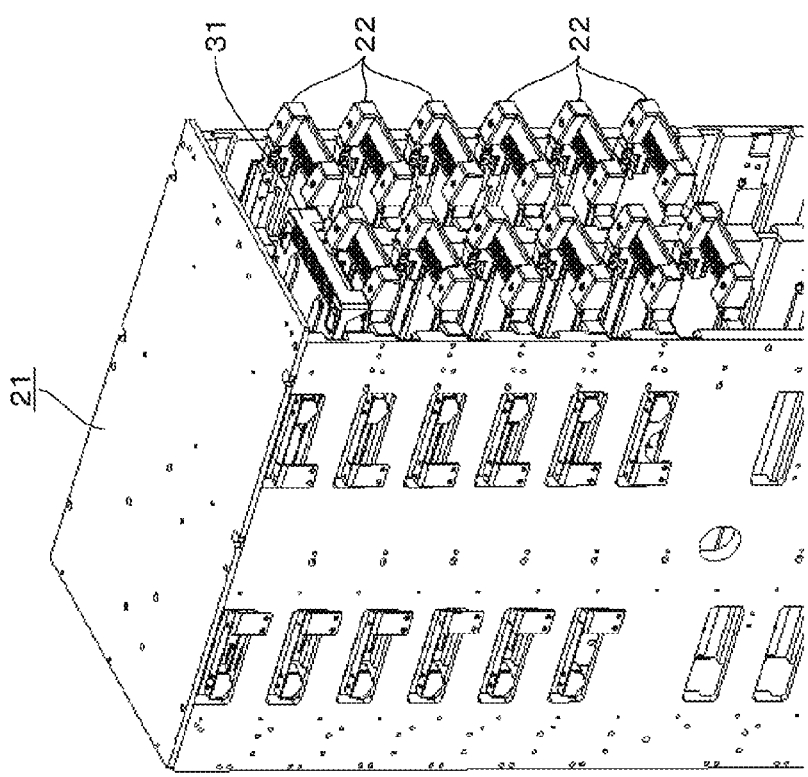
Figure 17:
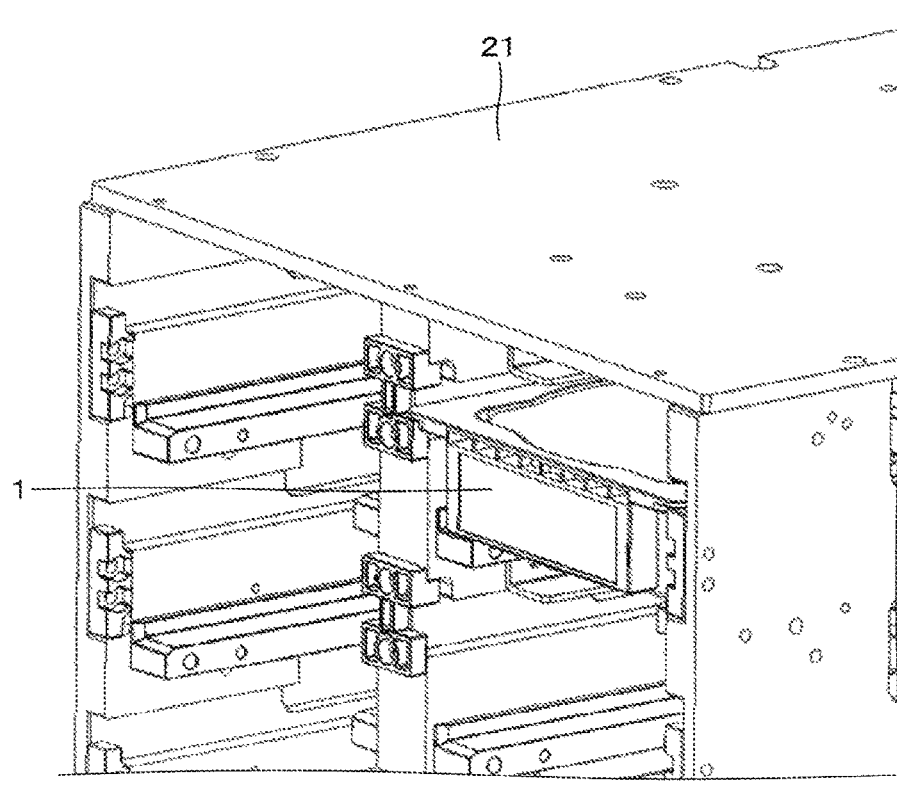
FIG. 17 is a perspective view of a part of the IE station.

As depicted in FIGS. 15A, 15B, 15C, and 16A, tray locks 22 are each provided in the vicinity of the rear opening of each storage section of the IE station 21. In the figure, a reference sign 22 is given only to some of the tray locks in order to avoid complication. Each tray lock 22 is a spring provided on a lower side of each slot. As depicted in FIGS. 16B and 17, each tray lock 22 has a mechanism that is automatically engaged with an end portion of a rear side of the case of the disc tray 1 by spring force when the disc tray 1 is inserted all the way back into the storage section. This mechanism prevents the disc tray 1 from jumping out of the storage section. FIGS. 16A 16B and 17 depict a state in which the disc tray 1 is mounted in the top storage section in the left column of the IE station 21 viewed in the direction of the figure.

Figure 18A:
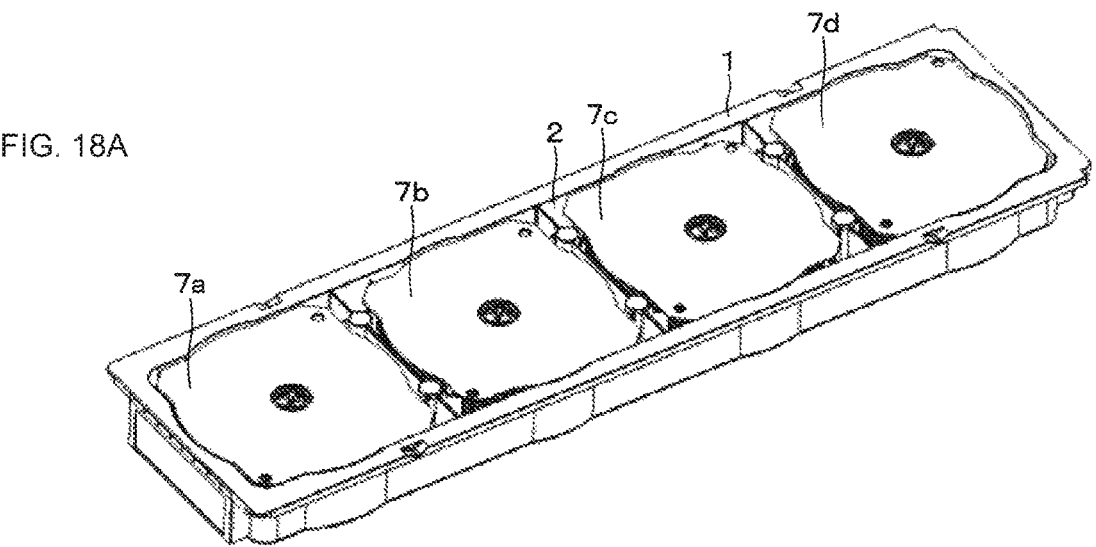
FIGS. 18A and 18B depicts perspective views of the disc tray and the disc tray on which a tray cover has been mounted.
Figure 18B:
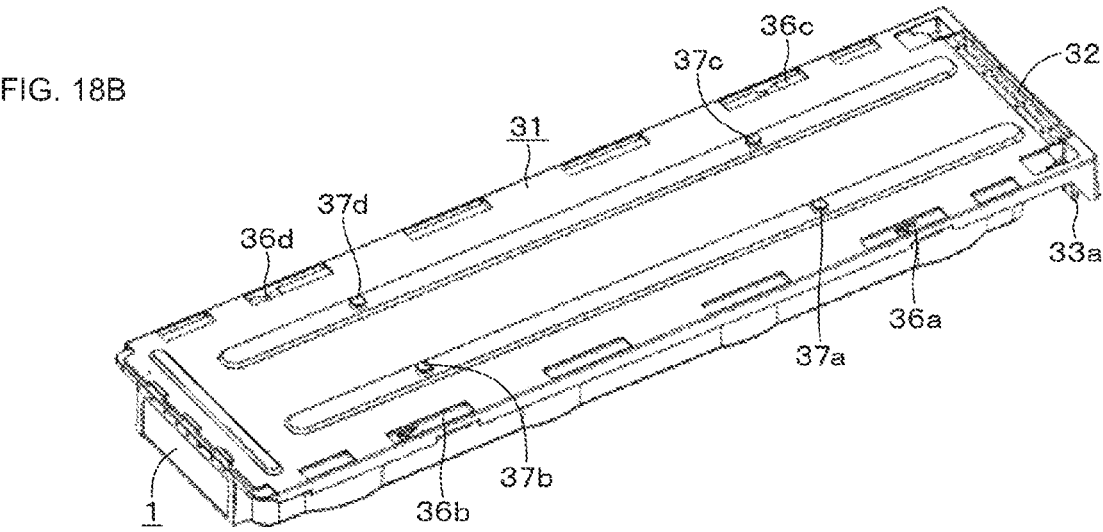

FIG. 18A depicts the disc tray 1 in which the surfaces of the stacked discs are covered by the disc covers 7a, 7b, 7c, and 7d as described with reference to FIG. 4. As depicted in FIG. 18B, a tray cover 31 is mounted so as to cover an opening on the upper side of the disc tray 1. The tray cover 31 is, as a whole, a rectangular plate-like molding including a synthetic resin. Plate-like protrusions on both sides of the case 2 of the disc tray 1 are slidably fitted into guide grooves provided on both sides of the tray cover 31. The guide grooves have a U-shaped cross section. In this manner, the tray cover 31 is mounted on the disc tray 1.

FIGS. 19A, 19B, 19C, 19D, and 19E depicts an example of the tray cover 31. FIG. 19A is a perspective view of the tray cover 31. In a case where the tray cover 31 is mounted on the disc tray 1, the tray cover 31 slides in the direction of an arrow a. In a case where the tray cover 31 is removed from the disc tray 1, the tray cover 31 slides in the direction of an arrow b. In the sliding direction at the time of mounting, the side on which the tray cover 31 is first inserted into the guide grooves of the disc tray 1 is defined as a front side.

FIG. 19B is a side view of the tray cover 31. FIG. 19C is a rear view of the tray cover 31 viewed from a rear side. FIG. 19D is a front view of the tray cover 31 viewed from the front side. FIG. 19E is a bottom view of the tray cover 31 viewed from the bottom. A rear end of the tray cover 31 is bent downward at a substantially right angle, forming a rear plate 32. A cutout is formed in a central portion of the rear plate 32. Unlocking levers 33a and 33b (hereinafter simply referred to as unlocking levers 33 in a case where the unlocking levers 33a and 33b do not need to be particularly distinguished from each other. It should be noted that notation in the figures distinguishes the unlocking levers 33a and 33b) are provided on an inner side of both corners of the rear plate 32.

Figure 20A:
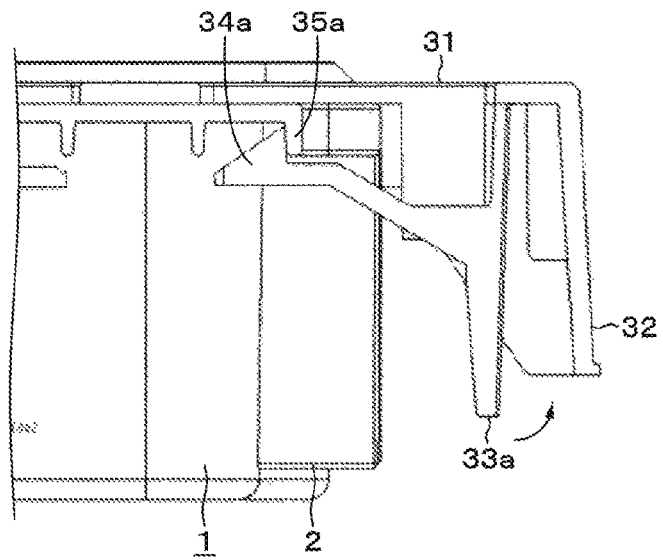
FIGS. 20A and 20B depicts a cross-sectional view and a perspective view used for describing a locking mechanism of the disc tray.
Figure 20B:
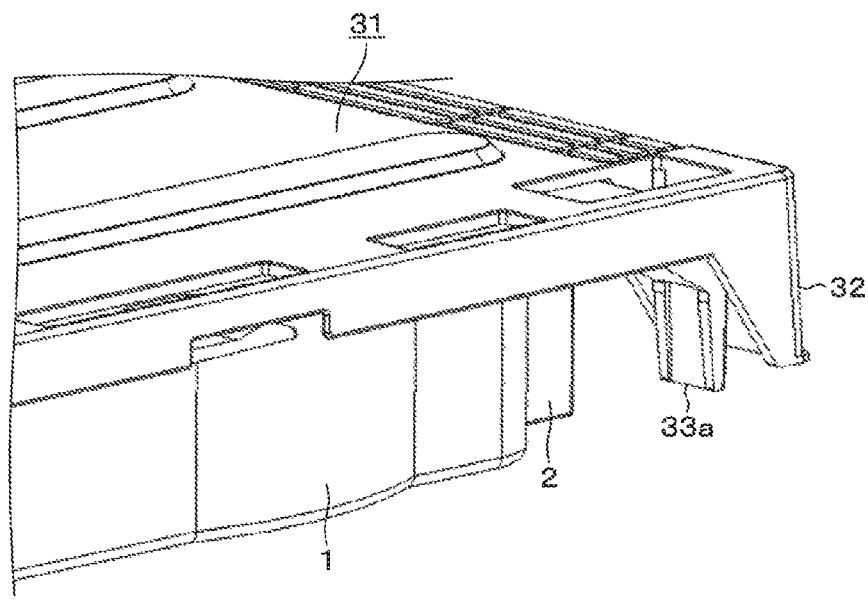

As depicted in FIGS. 20A and 20B, each unlocking lever 33 rises downward from an inner surface of an upper surface of the tray cover 31. A distal end portion of the tray cover 31 is turnable in the direction indicated by an arrow against the resin spring force. An arm is extended forward from a substantially intermediate position of each of the unlocking levers 33. Locking claws 34a and 34b are each formed in a distal end of the corresponding arm. The locking claws 34a and 34b (hereinafter simply referred to as locking claws 34 in a case where the locking claws 34a and 34b do not need to be particularly distinguished from each other. It should be noted that notation in the figures distinguishes the locking claws 34a and 34b) have an arrow-like cross section.

Plate-like protrusions 35a and 35b (hereinafter simply referred to as protrusions 35 in a case where the protrusions 35a and 35b do not need to be distinguished from each other. It should be noted that notation in the figures distinguishes the protrusions 35a and 35b) extending downward from both sides of the case 2 of the disc tray 1 are formed. In a state where step portions of the locking claws 34 are engaged with the protrusions 35 inside the storage section of the IE station 21, pulling the tray cover 31 rearward cannot remove the tray cover 31 from the disc tray 1. By contrast, holding and gripping the unlocking levers 33 by hands turns distal end portions of the locking claws 34 in the direction of the arrow in FIG. 20A, thereby releasing the engagement state between the disc tray 1 and the tray cover 31. Then, the tray cover 31 can be pulled rearward from the storage section of the IE station 21.

As depicted in FIG. 19E, springs (resin springs) 36a, 36b, 36c, and 36d are formed in the tray cover 31. In a state where the tray cover 31 is mounted on the disc tray 1, the springs 36a, 36b, 36c, and 36d (hereinafter simply referred to as springs 36 in a case where the springs 36a, 36b, 36c, and 36d do not need to be particularly distinguished from each other. It should be noted that notation in the figures distinguishes the springs 36a, 36b, 36c, and 36d) constantly apply force in the direction in which the disc tray 1 and the tray cover 31 are in close contact with each other.

Figure 21A:
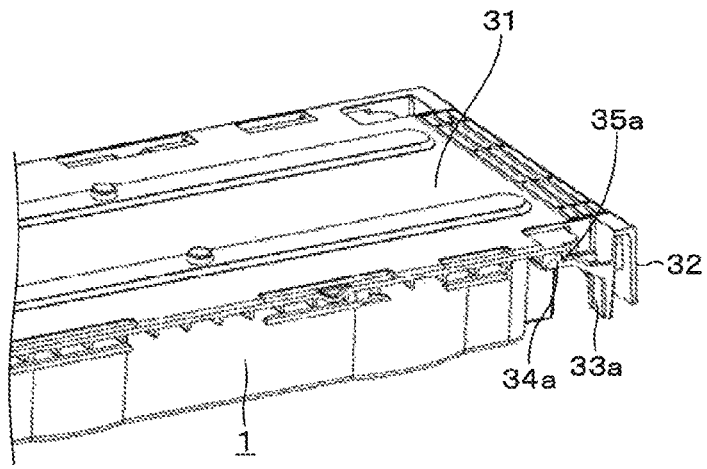
FIGS. 21A, 21B, and 21C depicts a perspective view, a side view, and a cross-sectional view used for describing a spring of the disc tray.
Figure 21B:
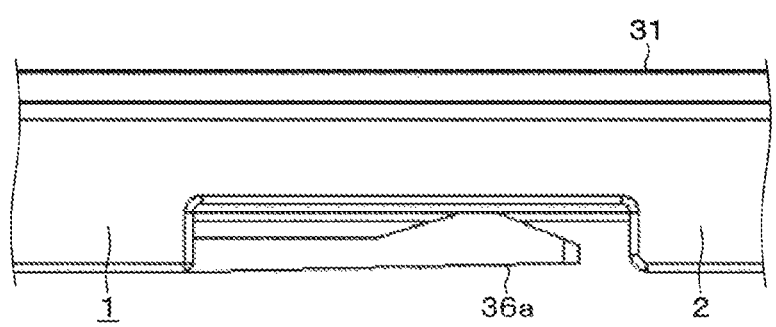
Figure 21C:
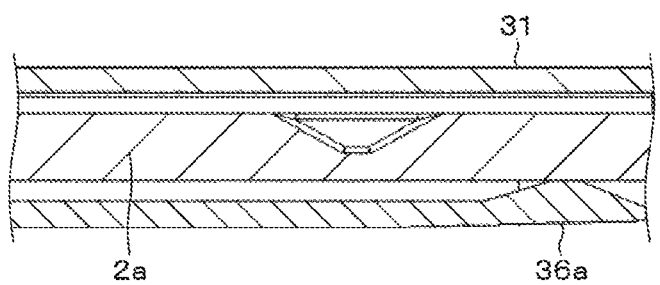
Figure 23B:
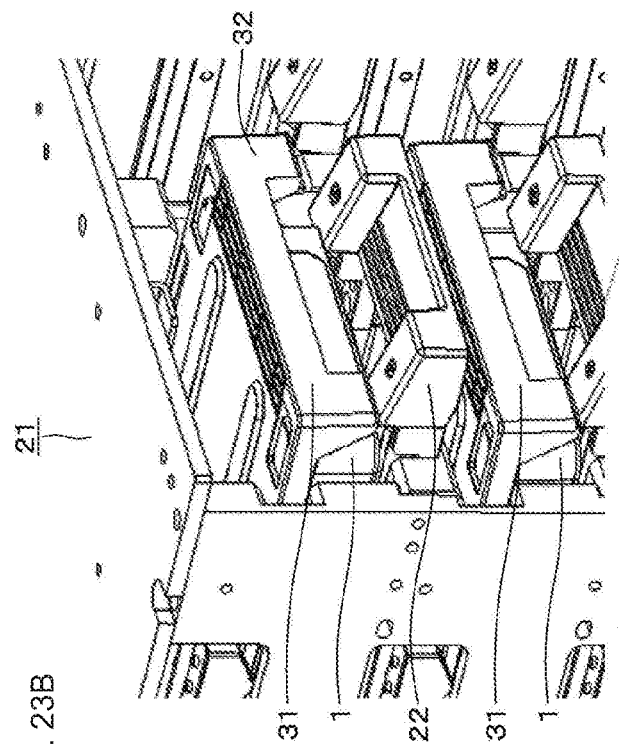
FIGS. 23A, 23B, 23C, and 23D depicts perspective views used for describing an operation when the disc tray is taken out from the IE station.
Figure 23D:
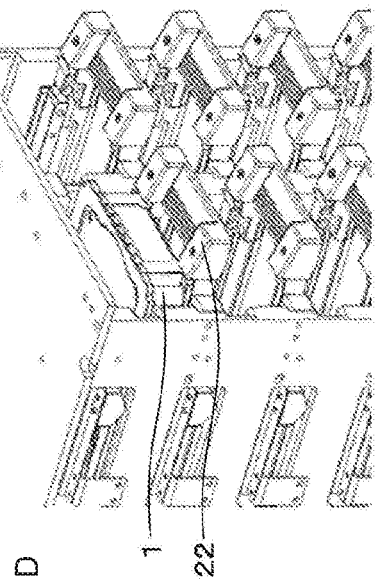
Figure 23A:
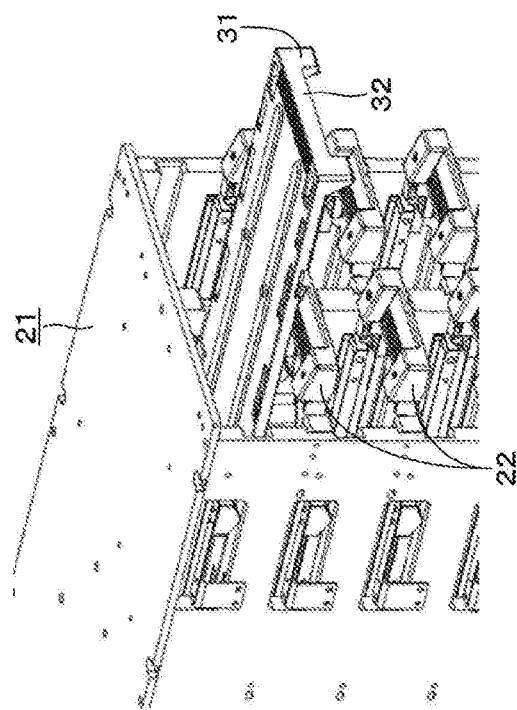
Figure 23C:
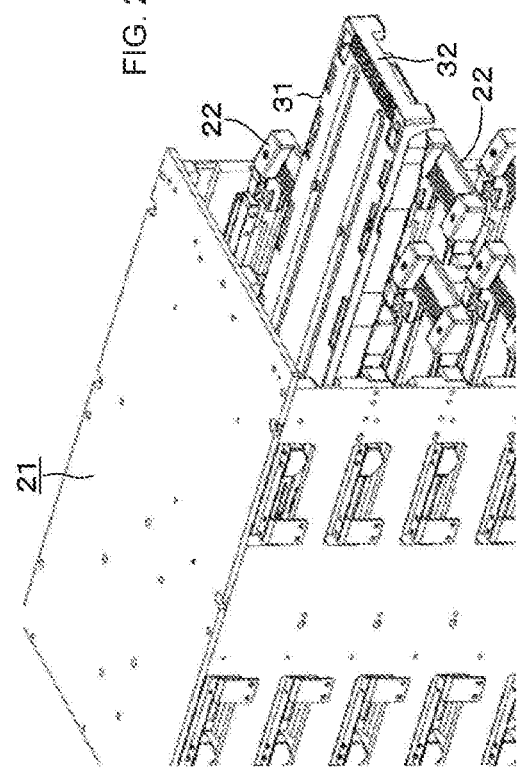

As depicted in FIGS. 19E, 21A and 21B, the springs 36a and 36b are formed in two positions on one edge of the tray cover 31, and the springs 36c and 36d are formed in two positions on the other edge. The springs 36 are provided in a direction in which the springs 36 hold end portions 2a (see FIG. 21C) from the lower side in a state where the tray cover 31 is mounted on the disc tray 1. The end portions 2a are provided on both sides of the case of the disc tray 1. Accordingly, the case 2 of the disc tray 1 and the tray cover 31 come into close contact with each other. Providing such a close contact mechanism between the case 2 and the tray cover 31 can prevent displacement of the discs, backlash of the tray cover 31, and intrusion of dust into the disc tray 1.

In addition, as depicted in FIGS. 19A, 19B, and 19C and FIGS. 22A, 22C, and 22D, positioning protrusions 37a, 37b, 37c, and 37d (hereinafter simply referred to as positioning protrusions 37 in a case where the positioning protrusions 37a, 37b, 37c, and 37d do not need to be particularly distinguished from each other. It should be noted that notation in the figures distinguishes the positioning protrusions 37a, 37b, 37c, and 37d) are formed in four positions of the surface of the tray cover 31. Each two of the positioning protrusions 37 are formed on a corresponding one of the front side and the rear side in the longitudinal direction of the surface of the tray cover 31. As enlarged and depicted in FIGS. 22C and 22D, each positioning protrusion 37 has a disc shape with a peripheral surface thereof extending toward a base portion.

As depicted in FIGS. 22B and 22D, on a bottom surface 2B of the case of the disc tray 1, a plurality of positioning holes 38a, 38b, 38c, and 38d (hereinafter simply referred to as positioning holes 38 in a case where the positioning holes 38a, 38b, 38c, and 38d do not need to be particularly distinguished from each other. It should be noted that notation in the figures distinguishes the positioning holes 38a, 38b, 38c, and 38d) is formed in positions corresponding to the positions of the positioning protrusions 37. In a case where the disc trays 1A and 1B each including the tray cover 31 have been stacked outside the IE station 21 or the like as depicted in FIGS. 22A and 22B, it is possible to secure the stability of stacking with the positioning protrusions 37 fitted into the positioning holes 38 as depicted in FIG. 22D. In addition, in a case where the above-described tray conveying robot 12 conveys the disc tray 1, each positioning hole 38 formed on the bottom surface 2B of the case 2 of the disc tray 1 is fitted into a corresponding positioning protrusion on a placement surface of the tray conveying robot 12. In this manner, the positioning holes 38 can be used both at the time of stacking and at the time of conveyance.

Description will be given with regard to taking out of the disc tray 1 from the IE station 21 with reference to FIGS. 23A, 23B, 23C, and 23D. As an example, description will be given with regard to a case where the disc tray 1 of the top storage section is taken out. In order to prevent the discs from jumping out of the disc tray 1 taken out and scattering, the disc tray 1 is taken out with the tray cover 31 mounted thereon. A method of mounting the cover after pulling out the disc tray 1 from the IE station 21 has, if employed, a risk of the discs falling from the disc tray 1.

Step #1 (FIG. 23A): The disc tray 1 has been inserted into the top stage of the IE station 21.

Step #1 (FIG. 23B): The tray cover 31 is inserted from the rear opening into the storage section (the top stage in FIG. 23B) in which the disc tray 1 to be taken out has been set.

Step #2 (FIG. 23C): Inserting the tray cover 31 until the tray cover 31 covers the opening of the case 2 engages the locking claws 34 with the protrusions 35 of the case 2, thereby engaging the tray cover 31 with the case of the disc tray 1.

Step #3 (FIG. 23D): In the state in FIG. 23C, the disc tray 1 with the upper surface thereof covered by the tray cover 31 can be taken out to the outside by lowering the tray lock 22 by one hand while pulling out, by the other hand, the disc tray 1 on which the tray cover 31 has been mounted. Since the disc tray 1 has been covered by the tray cover 31, it is possible to prevent the internal discs from jumping out. Further, when the disc tray 1 is taken out, both hands are always used in other places so as not to touch the disc tray 1 and the unlocking levers 33 of the tray cover 31. That is, a human error can be prevented.

Description will be given with regard to an operation of loading the disc tray 1, on which the tray cover 31 has been mounted, to a predetermined empty storage section of the IE station 21 from the outside.

Step #11: The disc tray 1 on which the tray cover 31 has been set is inserted into the predetermined storage section from the rear opening.

Step #12: At the time when the disc tray 1 has been inserted all the way back, the tray lock 22 is operated, locking the storage state of the disc tray 1.

Step #13: The tray cover 31 is pulled rearward (frontward) while the two unlocking levers 33 are being operated simultaneously.

Step #14: Only the tray cover 31 is pulled out. When the tray cover 31 is pulled out, the tray cover 31 cannot be pulled out unless the unlocking levers 33 are operated simultaneously by both hands. Thus, the risk of erroneous unlock can be eliminated.

It is noted that the disc tray 1 loaded into the IE station 21 has no tray cover 21. The tray conveying robot 12 pulls out the disc tray 1 while lifting the disc tray 1 and running over steps formed on the bottom surface of the storage section. This operation is similar to the operation for the case where the disc tray 1 is pulled out from the tray rack 11.

In addition, in a case where the tray conveying robot 12 erroneously attempts to pull out the disc tray 1 with the tray cover 31 mounted thereon, the tray conveying robot 12 cannot pull out the disc tray 1 from the front side since the rear plate 32 of the tray cover 31 collides with a wall of the storage section. In this manner, an erroneous operation can be prevented.

2. Modification

Although the embodiments of the present technology have been specifically described above, the embodiments of the present technology are not limited to each of the embodiments described above, and various modifications based on the technical idea of the present technology can be made. Further, the configurations, methods, processes, shapes, materials, numerical values, and the like of the above-described embodiments can be combined with each other without departing from the gist of the present technology.

It is noted that the present technology can also be configured as follows.

(1)

A disc storage apparatus including:

a case including an opening on an upper surface of the case and capable of storing N rows of stacked M disc-shaped recording media (N and M each indicate a positive integer of two or greater);

a tray cover configured to slide from a rear end of the case and cover the opening; and a locking mechanism configured to lock a state of the opening being covered.

(2)

The disc storage apparatus according to (1), in which the locking mechanism includes a lever provided in a vicinity of the rear end of the case, and a locking claw provided on the lever and configured to be engageable with/disengageable from the case by turn of the lever.

(3)

The disc storage apparatus according to (1) or (2), in which the locking mechanism includes two locking mechanisms in a vicinity of the rear end of the case.

(4)

The disc storage apparatus according to any one of (1) to (3), in which the case and the tray cover each include a resin molding.

(5)

The disc storage apparatus according to any one of (1) to (4), in which a cover is arranged on a top disc among the disc-shaped recording media stacked in each row of the disc tray.

(6)

The disc storage apparatus according to any one of (1) to (5), in which a close-contact section is provided in a plurality of positions in the tray cover, the close-contact section including a spring configured to bring the tray cover covering the opening into close contact with the case.

(7)

The disc storage apparatus according to any one of (1) to (6), in which a plurality of protrusions are provided on an outer surface of the tray cover, and a plurality of holes corresponding to positions of the plurality of protrusions are formed on a bottom surface of the case.

(8)

A disc archive apparatus including:

a disc storage apparatus capable of storing N rows of stacked M discs (N and M each indicate a positive integer of two or greater);

first and second storage racks including a plurality of storage sections, each storage section having front and rear openings and configured to allow the disc storage apparatus to be mounted/taken out through the openings;

a conveying robot configured to select the disc storage apparatus specified and convey the disc storage apparatus through the front opening of each of the first and second storage racks;

a disc drive including a plurality of drives configured to perform recording on or reproducing from disc-shaped recording media in the disc storage apparatus conveyed by the conveying robot; and a disc conveying picker configured to set the discs from the disc storage apparatus into each of the drives of the disc drive, in which the disc storage apparatus stores N rows of stacked M disc-shaped recording media (N and M each indicate a positive integer of two or greater) in a case having an opening on an upper surface of the case, and in a case where the disc storage apparatus is taken out from the rear opening of one of the storage sections of the second storage rack, a tray cover slides from the rear opening and covers the opening and the disc storage apparatus is taken out with the tray cover covering the opening.

(9)

The disc archive apparatus according to (8), further including:

a locking mechanism configured to lock a state of the tray cover covering the opening.

(10)

The disc archive apparatus according to (8) or (9), in which a plurality of protrusions are provided on an outer surface of the tray cover, a plurality of holes corresponding to positions of the plurality of protrusions are formed on a bottom surface of the case, and the plurality of holes are used for positioning for a case where the conveying robot conveys the disc storage apparatus, and the plurality of protrusions and the plurality of holes are used for positioning for a case where a plurality of the disc storage apparatuses are stacked on each other.

1 . . . Disc tray
2 . . . Case
5 . . . Disc
6 . . . Film
7 . . . Rib
11 . . . Tray rack
12 . . . Tray conveying robot
13 . . . Disc drive
13a . . . Drive tray
15 . . . Disc conveying picker
16 . . . Turntable
21 . . . IE station
22 . . . Tray lock
31 . . . Tray cover
33a, 33b . . . Unlocking lever
34a, 34b . . . Locking claw

The invention claimed is:

1. A disc storage apparatus, comprising:
a case including an opening on an upper surface of the case, wherein
the case is capable to store N rows of stacked M disc-shaped recording media, wherein each of N and M indicates a positive integer equal to or greater than two;
a tray cover configured to slide from a rear end of the case and cover the opening; and
a locking mechanism configured to lock a state of the covered opening, wherein the locking mechanism includes:
a lever in a vicinity of the rear end of the case; and
a locking claw on the lever, wherein the locking claw is configured to be engageable with or disengageable from the case based on turn of the lever.

2. The disc storage apparatus according to claim 1, wherein the locking mechanism includes two locking mechanisms in the vicinity of the rear end of the case.

3. The disc storage apparatus according to claim 1, wherein the case and the tray cover each include a resin molding.

4. The disc storage apparatus according to claim 1, wherein a cover is arranged on a top disc among the disc-shaped recording media stacked in each row of the case.

5. The disc storage apparatus according to claim 1, wherein
the tray cover includes a close-contact section in a plurality of positions in the tray cover, and
the close-contact section includes a spring configured to bring the tray cover configured to cover the opening into close contact with the case.

6. The disc storage apparatus according to claim 1, wherein
an outer surface of the tray cover includes a plurality of protrusions, and
a bottom surface of the case includes a plurality of holes corresponding to positions of the plurality of protrusions.

7. A disc archive apparatus, comprising:
a disc storage apparatus capable to store N rows of stacked M discs, wherein each of N and M indicates a positive integer equal to or greater than two;
a first storage rack and a second storage rack, wherein each of the first storage rack and the second storage rack includes including a plurality of storage sections,
each storage section of the plurality of storage sections includes a front opening and a rear opening, and
each storage section of the plurality of storage sections is configured to allow the disc storage apparatus to be mounted or taken out through the front opening and the rear opening;

a conveying robot configured to:
  select the disc storage apparatus specified; and
  convey the disc storage apparatus through the front opening of each of the first storage rack and the second storage rack;
a disc drive including a plurality of drives configured to record on or reproduce from disc-shaped recording media in the disc storage apparatus conveyed by the conveying robot; and
a disc conveying picker configured to set the discs from the disc storage apparatus into each drive of the plurality of drives of the disc drive, wherein
the disc storage apparatus is capable to store the N rows of the stacked M disc-shaped recording media in a case having an opening on an upper surface of the case,
each of the N and M indicates the positive integer equal to or greater than two, and
based on the disc storage apparatus taken out from the rear opening of one of the plurality of storage sections of the second storage rack, a tray cover is configured to slide from the rear opening and cover the rear opening, wherein the disc storage apparatus is taken out with the rear opening covered by the tray cover.

8. The disc archive apparatus according to claim 7, further comprising
  a locking mechanism configured to lock a state of the rear opening covered by the tray cover.

9. The disc archive apparatus according to claim 7, wherein
  an outer surface of the tray cover includes a plurality of protrusions,
  a bottom surface of the case includes a plurality of holes corresponding to positions of the plurality of protrusions,
  the plurality of holes are used to position the disc storage apparatus conveyed by the conveying robot, and
  the plurality of protrusions and the plurality of holes are used to position a plurality of disc storage apparatuses stacked on each other.

10. A disc storage apparatus, comprising:
a case including an opening on an upper surface of the case, wherein
the case is capable to store N rows of stacked M disc-shaped recording media, wherein each of N and M indicates a positive integer equal to or greater than two, and
a cover is arranged on a top disc among the disc-shaped recording media stacked in each row of the case;
a tray cover configured to slide from a rear end of the case and cover the opening; and
a locking mechanism configured to lock a state of the covered opening.

11. A disc storage apparatus, comprising:
a case including an opening on an upper surface of the case, wherein
the case is capable to store N rows of stacked M disc-shaped recording media, wherein each of N and M indicates a positive integer equal to or greater than two;
a tray cover configured to slide from a rear end of the case and cover the opening, wherein
the tray cover includes a close-contact section in a plurality of positions in the tray cover, and
the close-contact section includes a spring configured to bring the tray cover configured to cover the opening into close contact with the case; and
a locking mechanism configured to lock a state of the covered opening.

* * * * *